(12) United States Patent
Choi et al.

(10) Patent No.: US 7,697,096 B2
(45) Date of Patent: Apr. 13, 2010

(54) LIQUID CRYSTAL DISPLAY AND PANEL THEREFOR

(75) Inventors: Nak-Cho Choi, Seoul (KR); Jae-Jin Lyu, Gyeonggi-do (KR); Chang-Hun Lee, Yongin-si (KR); Dong-Ki Lee, Seoul (KR); Hak-Sun Chang, Seoul (KR); Soo-Jin Kim, Suwon-si (KR); Hee-Wook Do, Suwon-si (KR); Jiangang Lu, Suwon-si (KR); Ji-Won Sohn, Seoul (KR); Mee-Hye Jung, Daejeon-si (KR); Il-Kook Huh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 370 days.

(21) Appl. No.: 11/002,663

(22) Filed: Dec. 3, 2004

(65) Prior Publication Data

US 2005/0162598 A1    Jul. 28, 2005

(30) Foreign Application Priority Data

Dec. 3, 2003   (KR) ............... 10-2003-0087128
Jun. 21, 2004  (KR) ............... 10-2004-0046102
Nov. 3, 2004   (KR) ............... 10-2004-0088808
Nov. 24, 2004  (KR) ............... 10-2004-0096864

(51) Int. Cl.
   *G02F 1/1337* (2006.01)

(52) U.S. Cl. ............... 349/129; 349/139; 349/138

(58) Field of Classification Search ............... 349/129, 349/130, 123, 139, 138, 191, 178, 158
See application file for complete search history.

(56) References Cited

U.S. PATENT DOCUMENTS 6,141,077 A  * 10/2000  Hirata et al. ............... 349/143
6,181,406 B1   1/2001  Morimoto et al.
6,184,968 B1 *  2/2001  Taylor-Smith ............... 349/158
6,327,016 B1  12/2001  Yamada et al.
6,396,559 B1 *  5/2002  Kishimoto et al. ........... 349/156
6,476,894 B1 * 11/2002  Kikkawa ..................... 349/123
6,532,054 B2 *  3/2003  Ohmuro et al. ............. 349/143
6,573,965 B1   6/2003  Liu et al.
6,587,173 B2 *  7/2003  Yoo et al. .................... 349/129
6,633,356 B1  10/2003  Kataoka et al. ............. 349/129
6,661,488 B1 * 12/2003  Takeda et al. ............... 349/117
6,665,041 B2  12/2003  Liao et al.
6,667,789 B2 * 12/2003  Chang et al. ................ 349/129
6,862,062 B2 *  3/2005  Kubo et al. .................. 349/129
2001/0043305 A1  11/2001  Ohmuro et al.
2002/0001058 A1   1/2002  Wang
2002/0135723 A1   9/2002  Wong
2002/0149728 A1 * 10/2002  Ogishima et al. ........... 349/129

(Continued)

FOREIGN PATENT DOCUMENTS

CN         1148182        4/1997

(Continued)

*Primary Examiner*—Thoi V Duong
(74) *Attorney, Agent, or Firm*—Cantor Colburn LLP

(57) ABSTRACT

A liquid crystal display is provided, which includes: a substrate; a field-generating electrode formed on the substrate; and a slope member formed on the substrate and having an inclination angle smaller than about 45 degrees.

13 Claims, 34 Drawing Sheets

U.S. PATENT DOCUMENTS

| | | |
|---|---|---|
| 2002/0159018 A1 | 10/2002 | Kataoka et al. |
| 2002/0163610 A1 | 11/2002 | Liao et al. |
| 2002/0163613 A1 | 11/2002 | Chang et al. |
| 2003/0112399 A1 | 6/2003 | Liao et al. |
| 2003/0164916 A1 | 9/2003 | Chien |

FOREIGN PATENT DOCUMENTS

| | | |
|---|---|---|
| CN | 1211745 A | 3/1999 |
| CN | 1385738 A | 12/2002 |
| CN | 1403859 A | 3/2003 |
| EP | 0548548 | 6/1993 |
| JP | 06281965 | 10/1994 |
| JP | 07333419 | 12/1995 |
| JP | 10010537 | 1/1998 |
| JP | 2000122065 | 4/2000 |
| JP | 2000193969 | 7/2000 |
| JP | 2002072189 | 3/2002 |
| JP | 2002107730 | 4/2002 |
| JP | 2002229029 | 8/2002 |
| JP | 2002229034 | 8/2002 |
| JP | 2002350855 | 12/2002 |
| JP | 2002357830 | 12/2002 |
| JP | 2003075873 | 3/2003 |
| JP | 2003149430 | 5/2003 |
| JP | 2003330011 | 11/2003 |
| JP | 2004053758 | 2/2004 |
| KR | 19990049034 | 7/1999 |
| KR | 1020000001609 | 1/2000 |
| KR | 1020000014534 | 3/2000 |
| KR | 1020000017451 | 3/2000 |
| KR | 100283511 | 12/2000 |
| KR | 100306798 | 8/2001 |
| KR | 100309918 | 9/2001 |
| KR | 100312761 | 10/2001 |
| KR | 1020010108987 | 12/2001 |
| KR | 1020010109000 | 12/2001 |
| KR | 1020020013307 | 2/2002 |
| KR | 1020020017313 | 3/2002 |
| KR | 1020030081957 | 10/2003 |
| KR | 1020040006663 | 1/2004 |
| KR | 1020040021379 | 3/2004 |
| KR | 1020040021380 | 3/2004 |
| KR | 1020040040816 | 5/2004 |
| KR | 1020040043769 | 5/2004 |
| KR | 1020040064750 | 7/2004 |
| TW | 559871 | 11/2003 |
| WO | 9617273 | 6/1996 |

\* cited by examiner

FIG.5

| Inclination Angle(θ) | #1 ∠θ | #2 ∠θ | #3 ∠θ |
|---|---|---|---|
| Cell gap | 3.66 | 3.62 | 3.52 |
| Tr(ms) | 7.34 | 8.35 | 9.32 |
| Tf(ms) | 6.61 | 6.52 | 6.02 |
| Ttot(ms) | 13.95 | 14.88 | 15.34 |
| Vw(V) | 6.4 | 6.6 | 6.3 |
| Vb(V) | 1.6 | 1.5 | 1.5 |

LIQUID CRYSTAL DISPLAY AND PANEL THEREFOR

BACKGROUND OF THE INVENTION

1. Field of the Invention

The present invention relates to a liquid crystal display and a panel therefor.

2. Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in absence of electric field, is spotlighted because of its high contrast ratio and wide reference viewing angle that is defined as a viewing angle making the contrast ratio equal to 1:10 or as a limit angle for the inversion in luminance between the grays.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the LCDs having the cutouts or the protrusions may have large response time. It is because the tilt directions of the liquid crystal molecules far from the cutouts and the protrusions are determined by push of the liquid crystal molecules on the field-generating electrodes or by collision with them and thus the alignment of the liquid crystal molecules is unstable and irregular. Although the response time may be improved by closely spacing the cutouts, it may cause the decrease of the aperture ratio.

SUMMARY OF THE INVENTION

A motivation of the present invention is to solve the problems of the conventional art.

A liquid crystal display is provided, which includes: a substrate; a field-generating electrode formed on the substrate; and a slope member formed on the substrate and having an inclination angle smaller than about 45 degrees.

The inclination angle may be smaller than about 20 degrees, preferably in a range of about 1-10 degrees, and more preferably in a range of about 1-5 degrees.

The slope member may have a gradually decreasing height.

The slope member may have a curved surface.

The slope member may include a ridge protruding upward.

The field generating electrode may have a cutout and the slope member may have a ridge substantially coinciding with the cutout.

The slope member may have a ridge substantially coinciding with an edge of the field generating electrode.

The slope member may include photosensitive organic insulator.

The slope member may be disposed on the field generating electrode.

The liquid crystal display panel may further include an alignment layer disposed on the slope member.

A liquid crystal display is provided, which includes: a substrate; a first field generating electrode formed on the substrate; a second field generating electrode disposed opposite the first field generating electrode; a liquid crystal layer disposed between the first field generating electrode and the second field generating electrode; and a slope member formed on the substrate and having an inclined surface that reduces response time of the liquid crystal layer.

The inclination angle may be in a range of about 1-10 degrees.

The slope member may have a gradually decreasing height.

The liquid crystal display may further include a first tilt direction determining member that determines tilt directions of liquid crystal molecules in the liquid crystal layer under an application of an electric field. The first tilt direction determining member may include a first cutout at the first field generating electrode. The slope member may be disposed on the second field generating electrode.

The slope member may have a ridge arranged alternate to the first cutout and the ridge of the slope member may substantially coincide with an edge of the first field generating electrode.

The liquid crystal display may further include a second tilt direction determining member including a second cutout at the second field generating electrode. The slope member may have a ridge substantially coinciding with the second cutout.

The slope member may include organic insulator having a dielectric constant equal to or smaller than the liquid crystal layer.

The liquid crystal layer may have negative anisotropy and subjected to a vertical alignment.

The first field generating electrode may have edges overlapping the second field generating electrode and the second field generating electrode may have no cutout.

The slope member may have a thickness in a range of about 0.5-2.0 microns.

A liquid crystal display panel is provided, which includes: a substrate; a gate line; a data line intersecting the first signal line; a thin film transistor connected to the gate line and the data line; a pixel electrode connected to the thin film transistor; and a slope member disposed on the pixel electrode and having an inclination angle lower than about 45 degrees.

The inclination angle may be in a range of about 1-10 degrees.

The slope member may have a curved surface.

The slope member may include a ridge disposed substantially on edges of the pixel electrode.

The data line and the pixel electrode may be curved and the pixel electrode may have a convex edge and a concave edge parallel to the convex edge.

The pixel electrode may have a cutout and the slope member may include a ridge substantially coinciding with the cutout of the pixel electrode.

The cutout may have an inversion symmetry with respect to a line bisecting the pixel electrode into upper and lower halves.

The cutout may extend oblique to the gate line.

The cutout may make an angle of about 45 degrees with the gate line.

The liquid crystal display panel may further include a storage electrode disposed on the same layer as the gate line and overlapping the pixel electrode.

A liquid crystal display panel is provided, which includes: a substrate; a field generating electrode formed on the substrate and having a first area; and a plurality of slope members disposed on the field generating electrode, having inclined surfaces, and occupying an area larger than half of the first area.

The slope members may have a periodically repeating minimal unit pattern disposed in a second area and the first area may include a plurality of the second areas.

The inclination angle may be in a range of about 1-10 degrees.

The field generating electrode may substantially fully cover the substrate.

The slope members may include ridges protruding upward.

The field generating electrode may have a cutout and the slope members may include ridges substantially coinciding with the cutout.

The slope members may have a thickness in a range of about 0.5-2.0 microns.

The slope member may include photosensitive organic insulator.

A liquid crystal display is provided, which includes: a first substrate; a plurality of first field generating electrodes formed on the first substrate; a second substrate facing the first substrate; a second field generating electrode disposed on the second substrate; a liquid crystal layer disposed between the first field generating electrodes and the second field generating electrode; and a plurality of slope members formed on one of the first and the second field generating electrodes, each slope member having a gradually decreasing height from a ridge.

The slope members may have a slope ranging about 1-10 degrees.

Each of the first field generating electrodes may have a first area and each of the slope members may occupy an area larger than half of the first area.

The slope members may reduce response time of the liquid crystal layer.

The liquid crystal display may further include a plurality of first tilt direction determining members that determine tilt directions of liquid crystal molecules in the liquid crystal layer under an application of an electric field and are disposed on the first substrate, wherein the slope members are disposed on the second substrate and arranged alternate to the first tilt direction determining members.

The first tilt direction determining members may include a plurality of first cutouts at the first field generating electrodes.

The liquid crystal display may further include a plurality of second tilt direction determining members that determine the tilt directions of liquid crystal molecules in the liquid crystal layer under an application of an electric field and are disposed on the second substrate.

The ridges of the slope members may substantially coincide with the second tilt direction determining members.

The second tilt direction determining members may include a plurality of second cutouts at the second field generating electrode.

The liquid crystal display may further include a plurality of first tilt direction determining members that determine tilt directions of liquid crystal molecules in the liquid crystal layer under an application of an electric field and are disposed on the second substrate, wherein the slope members are disposed on the first substrate and arranged alternate to the first tilt direction determining members.

The first tilt direction determining members may include a plurality of first cutouts at the second field generating electrode.

The liquid crystal display may further include a plurality of second tilt direction determining members that determine the tilt directions of liquid crystal molecules in the liquid crystal layer under an application of an electric field and are disposed on the first substrate.

The ridges of the slope members substantially coincide with the second tilt direction determining members.

The second tilt direction determining members may include a plurality of second cutouts at the first field generating electrodes.

BRIEF DESCRIPTION OF THE DRAWINGS

The present invention will become more apparent by describing embodiments thereof in detail with reference to the accompanying drawings in which:

FIG. 5 is a table illustrating measured response time of liquid crystal for slope members having various inclination angles;

DETAILED DESCRIPTION OF EMBODIMENTS

Figure 1:
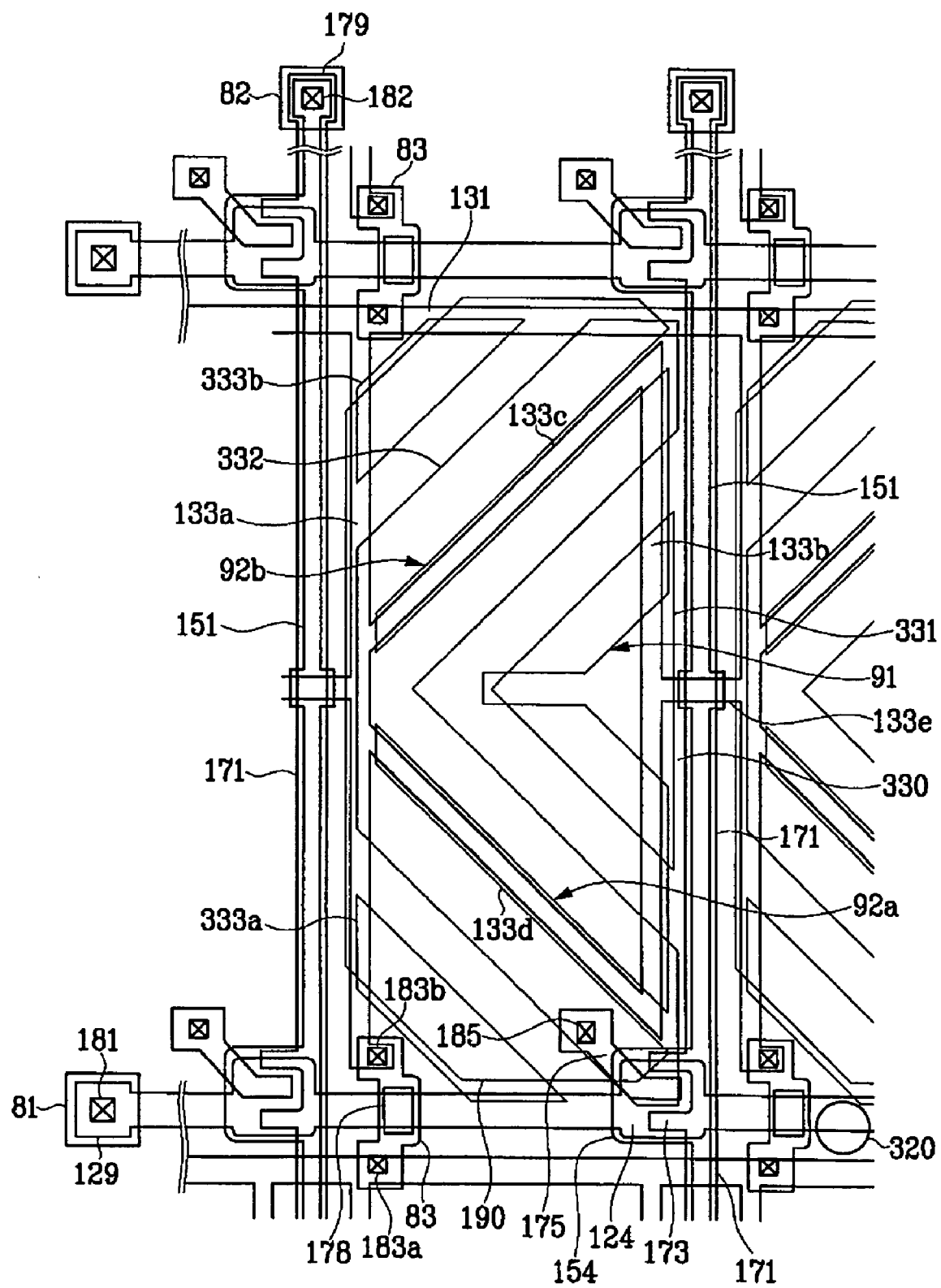
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

An LCD according to an embodiment of the present invention will be described in detail with reference to FIGS. 1-4.

Figure 2:
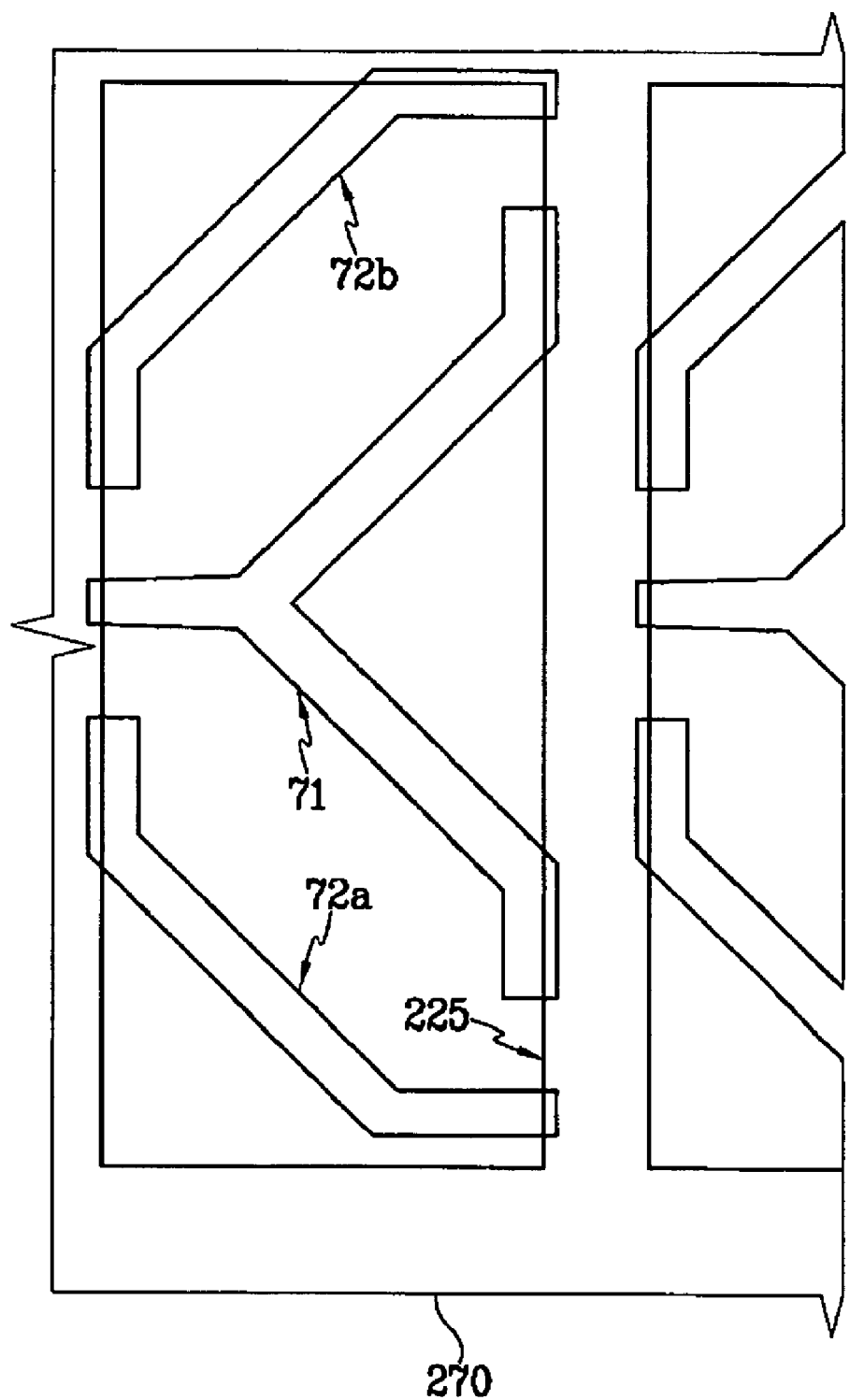
FIG. 2 is a layout view of a common electrode panel of an LCD according to an embodiment of the present invention.
Figure 3:
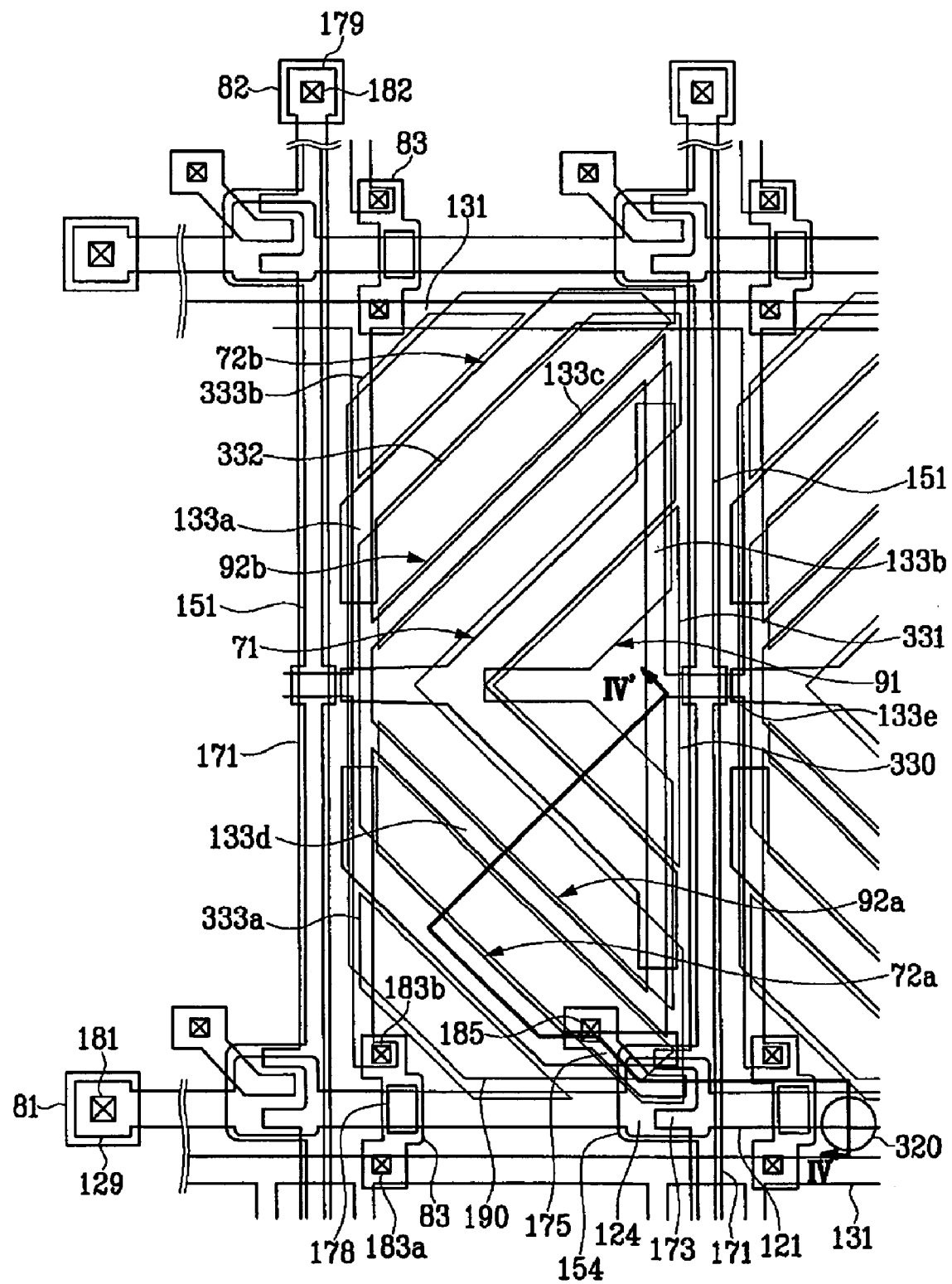
FIG. 3 is a layout view of an LCD including the TFT array panel shown in FIG. 1 and the common electrode panel shown in FIG. 2.
Figure 4:
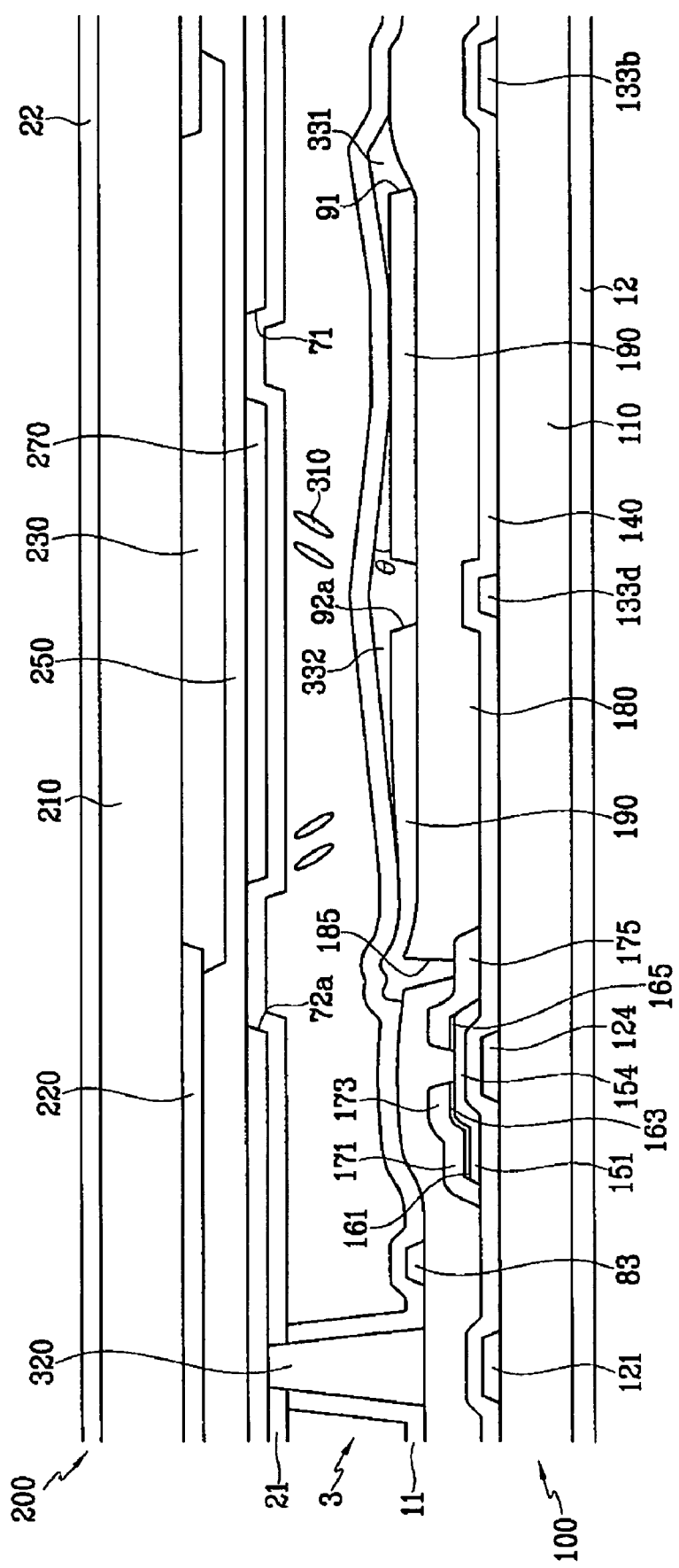
FIG. 4 is a sectional view of the LCD shown in FIG. 3 taken along the line IV-IV'.

FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, and FIG. 4 is a sectional view of the LCD shown in FIG. 3 taken along the line IV-IV'.

An LCD according to an embodiment of the present invention includes a TFT array panel 100, a common electrode panel 200, and a LC layer 3 interposed between the panels 100 and 200.

The TFT array panel 100 is now described in detail with reference FIGS. 1, 3 and 4.

A plurality of gate lines 121 and a plurality of storage electrode lines 131 are formed on an insulating substrate 110 such as transparent glass.

The gate lines 121 extend substantially in a transverse direction and are separated from each other and transmit gate signals. Each gate line 121 includes a plurality of projections forming a plurality of gate electrodes 124 and an end portion 129 having a large area for contact with another layer or an external driving circuit. The gate lines 121 may extend to be connected a driving circuit that may be integrated on the TFT array panel 100.

Each storage electrode line 131 extends substantially in the transverse direction and is disposed between adjacent two of the gate lines 121 and close to upper one of the two gate lines 121. Each storage electrode line 131 includes a plurality of sets of branches 133a-133d and a plurality of connections 133e connecting the branches 133a-133d.

A set of branches 133a-133d includes two longitudinal branches forming first and second storage electrodes 133a and 133b and spaced apart from each other and two oblique branches forming third and fourth storage electrodes 133c and 133d and connected between the first and the second storage electrodes 133a and 133b. In detail, the first storage electrode 133a has a free end portion and a fixed end portion that is connected to the storage electrode line 131 and has a projection. The third and the fourth storage electrodes 133c and 133d extend approximately from a center of the first storage 133a and upper and lower ends of the second storage electrode 133b, respectively.

Each of the connections 133e is connected between a first storage electrode 133a of a set of storage electrodes 133a-133d and a second storage electrode 133b of another set of storage electrodes 133a-133d adjacent thereto.

The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction.

The gate lines 121 and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may have a multi-layered structure including two films having different physical characteristics. One of the two films is preferably made of low resistivity metal including Al containing metal, Ag containing metal, and Cu containing metal for reducing signal delay or voltage drop in the gate lines 121 and the storage electrode lines 131. The other film is preferably made of material such as Mo containing metal, Cr, Ta or Ti, which has good physical, chemical, and electrical contact characteristics with other materials such as indium tin oxide (ITO) or indium zinc oxide (IZO). Good examples of the combination of the two films are a lower Cr film and an upper Al—Nd alloy film and a lower Al film and an upper Mo film.

In addition, the lateral sides of the gate lines 121 and the storage electrode lines 131 are inclined relative to a surface of the substrate, and the inclination angle thereof ranges about 20-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124. The semiconductor stripes 151 become wide near the gate lines 121 and the storage electrode lines 131 such that the semiconductor stripes 151 cover large areas of the gate lines 121 and the storage electrode lines 131.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range between about 30-80 degrees.

A plurality of data lines 171, a plurality of drain electrodes 175 separated from the data lines 171, and a plurality of isolated metal pieces 178 are formed on the ohmic contacts 161 and 165 and the gate insulating layer 140.

The data lines 171 for transmitting data voltages extend substantially in the longitudinal direction and crossing the gate lines 121 at right angles. The data lines 171 also intersect the storage electrode lines 131 and the connections 133e such that each data line 171 is disposed between the first and the second storage electrodes 133a and 133b in adjacent sets of the branches 133a-133d of the storage electrode lines 131. Each data line 171 includes an end portion 179 having a large area for contact with another layer or an external device. Each data line 171 includes a plurality of source electrodes projecting toward the drain electrodes 175.

Each drain electrode 175 includes an end portion having a large area for contact with another layer and another end portion disposed on a gate electrode 124 and partly enclosed by a source electrode 173. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The metal pieces 178 are disposed on the gate lines 121 near the end portions of the storage electrodes 133a.

The data lines 171, the drain electrodes 175, and the metal pieces 178 are preferably made of refractory metal such as Cr, Mo, Ti, Ta or alloys thereof. However, they may also have a multilayered structure including a low-resistivity film (not shown) and a good-contact film (not shown). A good example of the combination is a lower Mo film, an intermediate Al film, and an upper Mo film as well as the above-described combinations of a lower Cr film and an upper Al—Nd alloy film and a lower Al film and an upper Mo film.

Like the gate lines 121 and the storage electrode lines 131, the data lines 171 and the drain electrodes 175 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 and the storage electrode lines 131 as described above, to smooth the profile of the surface, thereby preventing the disconnection of the data lines 171.

A passivation layer 180 is formed on the data lines 171, the drain electrodes 175, the metal pieces 178, and the exposed portions of the semiconductor stripes 151. The passivation layer 180 is preferably made of inorganic insulator such as silicon nitride or silicon oxide, photosensitive organic material having a good flatness characteristic, or low dielectric insulating material having dielectric constant lower than 4.0 such as a-Si:C:O and a-Si:O:F formed by plasma enhanced chemical vapor deposition (PECVD). The passivation layer 180 may have a double-layered structure including a lower inorganic film and an upper organic film.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 181 exposing the end portions 129 of the gate lines 171, a plurality of contact holes 183a exposing portions of the storage electrode lines 131 near the fixed end portions of the first storage electrodes 133a and a plurality of contact holes 183b exposing the projections of the free end portions of the first storage electrodes 133a.

A plurality of pixel electrodes 190, a plurality of contact assistants 81 and 82, and a plurality of overpasses 83, which are preferably made of transparent conductor such as ITO or IZO or reflective conductor such as Ag or Al, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 supplied with the data voltages generate electric fields in cooperation with the common electrode 270, which determine the orientations of liquid crystal molecules 310 in the liquid crystal layer 3.

A pixel electrode 190 and the common electrode 270 form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131 including the storage electrodes 133a-133d.

Each pixel electrode 190 is chamfered at its left corners and the chamfered edges of the pixel electrode 190 make an angle of about 45 degrees with the gate lines 121. Each pixel electrode 190 has main planar edges parallel to one of the gate lines 121 or the data lines 171.

Each pixel electrode 190 has a lower cutout 92a, a center cutout 91, and an upper cutout 92b, which partition the pixel electrode 190 into a plurality of partitions. The cutouts 91-92b substantially have an inversion symmetry with respect to an imaginary transverse line bisecting the pixel electrode 190.

The lower and the upper cutouts 92a and 92b obliquely extend from a right edge of the pixel electrode 190 near an upper right corner approximately to a center of a left edge of the pixel electrode 190 and overlap the third and the fourth storage electrodes 133c and 133d. The lower and the upper cutouts 92a and 92b are disposed at lower and upper halves of the pixel electrode 190, respectively, which can be divided by the imaginary transverse line. The lower and the upper cutouts 92a and 92b make an angle of about 45 degrees to the gate lines 121, and they extend substantially perpendicular to each other.

The center cutout 91 extends along the imaginary transverse line and has an inlet from the right edge of the pixel electrode 190, which has a pair of inclined edges substantially parallel to the lower cutout 92a and the upper cutout 92b, respectively.

Accordingly, the lower half of the pixel electrode 190 is partitioned into two lower partitions by the lower cutout 92a and the upper half of the pixel electrode 190 is also partitioned into two upper partitions by the upper cutout 92b. The number of partitions or the number of the cutouts is varied depending on the design factors such as the size of pixels, the ratio of the transverse edges and the longitudinal edges of the pixel electrodes, the type and characteristics of the liquid crystal layer 3, and so on.

The contact assistants 81 and 82 are connected to the end portions the end portions 129 of the gate lines 121 and the end portions 179 of the data lines 171 through the contact holes 181 and 182, respectively. The contact assistants 81 and 82 protect the end portions 129 and 179 and complement the adhesion of the end portions 129 and 179 and external devices.

The overpasses 83 cross over the gate lines 121 and they are connected to the exposed projection of the fixed end portions of the first storage electrodes 133a and the exposed portions of the storage electrode lines 131 through the contact holes 183b and 183a, respectively, which are disposed opposite each other with respect to the gate lines 121. The overpasses 83 overlaps the metal pieces 178 and they may be electrically connected to the metal pieces 178. The storage electrode lines 131 including the storage electrodes 133a-133d along with the overpasses 83 and the metal pieces 178 are used for repairing defects in the gate lines 121, the data lines 171, or the TFTs. The electrical connection between the gate lines 121 and the storage electrode lines 131 for repairing the gate lines 121 is obtained by illuminating the cross points of the gate lines 121 and the overpasses 83 by a laser beam to electrically connect the gate lines 121 to the overpasses 83. In this case, the metal pieces 178 enhance the electrical connection between the gate lines 121 and the overpasses 83.

A plurality of sets of slope members 331-333b preferably made of insulator are formed on the pixel electrodes 190 and the passivation layer 180. The dielectric constant of the slope members 331-333b is preferably equal to or lower than the LC layer 3. Each set of the slope members 331-333b includes four slope members 331-333b disposed on a pixel electrode 190. Each of the slope members 331-333b has principal edges parallel to edges of the cutouts 91-92b and the chamfered left edges of the pixel electrode 190 and disposed between the cutouts 91-92b or between the cutouts 92a and 92b and the chamfered left edges of the pixel electrode 190 and secondary edges parallel to the gate lines 121 or the data lines 171 such that it has a planar shape of trapezoid, triangle, or chevron. At least one of planar boundaries of each slope member is inclined to one of the main planar edges of the pixel electrode 190 and parallels the chamfered left edge of the pixel electrode 190. Each of the slope members 331-333b has a ridge, which is disposed approximately on center lines of the cutouts 92a and 92b, on the edges of the cutout 91, or on the chamfered edges of the pixel electrode 190 and extends therealong, and inclined surfaces that have heights decreasing from the ridge to the principal edges. The height of the ridge is preferably in a range of about 0.5-2.0 microns and the inclination angle θ of the inclined surfaces relative to the surface of the substrate 110 is preferably smaller than about 45 degrees and more preferably in a range of about 1-10 degrees. The inclined surfaces may be straight or curved and the inclination angle of the curved surface can be defined as the average inclination angle or the inverse tangent of the ratio of altitude to length of a bottom edge of a right triangle having a lateral edge that connects a top and a lateral edge point of a slope member 331-333b. It is preferable that a set of the slope members 331-333b occupy an area equal to or larger than half of a pixel electrode 190. The slope members 331-333b for adjacent pixel electrodes 190 may be connected to each other.

The description of the common electrode panel 200 follows with reference to FIGS. 2-4.

A light blocking member 220 called a black matrix for preventing light leakage is formed on an insulating substrate 210 such as transparent glass. The light blocking member 220 may include a plurality of openings 225 that face the pixel electrodes 190 and may have substantially the same planar shape as the pixel electrodes 190. Otherwise, the light blocking member 220 may include linear portions corresponding to the data lines 171 and other portions corresponding to the TFTs.

A plurality of color filters 230 are formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors.

An overcoat 250 for preventing the color filters 230 from being exposed and for providing a flat surface is formed on the color filters 230 and the light blocking member 220.

A common electrode 270 preferably made of transparent conductive material such as ITO and IZO is formed on the overcoat 250.

The common electrode 270 has a plurality of sets of cutouts 71-72b.

A set of cutouts 71-72b face a pixel electrode 190 and include a lower cutout 72a, a center cutout 71, and an upper cutout 72b. Each of the cutouts 71-72b is disposed between adjacent cutouts 91-92b of the pixel electrode 190 or between a cutout 92a or 92b and a chamfered edge of the pixel electrode 190. In addition, each of the cutouts 71-72b has at least an oblique portion extending parallel to the lower cutout 92a or the upper cutout 92b of the pixel electrode 190, and the distances between adjacent two of the cutouts 71-72b and 91-92b, the oblique portions thereof, the oblique edges thereof, and the chamfered edges of the pixel electrode 190, which are parallel to each other, are substantially the same. The cutouts 71-72b have substantially an inversion symmetry with respect to the above-described transverse line bisecting the pixel electrode 190.

Each of the lower and upper cutouts 72a and 72b includes an oblique portion extending approximately from a left edge of the pixel electrode 190 approximately to lower or upper edge of the pixel electrode 190, and transverse and longitudinal portions extending from respective ends of the oblique portion along edges of the pixel electrode 190, overlapping the edges of the pixel electrode 190, and making obtuse angles with the oblique portion.

The center cutout 71 includes a central transverse portion extending approximately from the left edge of the pixel electrode 190 along the third storage electrode 133c, a pair of oblique portions extending from an end of the central transverse portion approximately to a right edge of the pixel electrode and making obtuse angles with the central transverse portion, and a pair of terminal longitudinal portions extending from the ends of the respective oblique portions along the right edge of the pixel electrode 190, overlapping the right edge of the pixel electrode 190, and making obtuse angles with the respective oblique portions.

The number of the cutouts 71-72b may be varied depending on the design factors, and the light blocking member 220 may also overlap the cutouts 71-72b to block the light leakage through the cutouts 71-72b.

A plurality of columnar spacers 320 preferably made of insulator are formed between the TFT array panel 100 and the common electrode panel 200. The spacers 320 contact the passivation layer 180 of the TFT array panel 100 and the common electrode 270 of the common electrode panel 200 such that they support a gap between the panels 100 and 200. The spacers 320 may be made of the same layer as the slope members 331-333b or may be incorporated into the passivation layer 180.

Alignment layers 11 and 21 that may be homeotropic are coated on inner surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film (not shown) for compensating the retardation of the LC layer 3. The retardation film has birefringence and gives a retardation opposite to that given by the LC layer 3. The retardation film may include uniaxial or biaxial optical compensation film, in particular, negative uniaxial compensation film.

The LCD may further include a backlight unit (not shown) supplying light to the LC layer 3 through the polarizers 12 and 22, the retardation film, and the panels 100 and 200.

It is preferable that the LC layer 3 has negative dielectric anisotropy and it is subjected to a vertical alignment that the LC molecules 310 in the LC layer 3 are aligned such that their long axes are substantially vertical to the surfaces of the panels 100 and 200 in absence of electric field.

As shown in FIG. 3, a set of the cutouts 91-92b and 71-72b divides a pixel electrode 190 into a plurality of sub-areas and each sub-area has two major edges.

The cutouts 91-92b and 71-72b and the slope members 331-332b control the tilt directions of the LC molecules in the LC layer 3. This will be described in detail.

Upon application of the common voltage to the common electrode 270 and a data voltage to the pixel electrodes 190, an electric field substantially perpendicular to the surfaces of the panels 100 and 200 is generated. The LC molecules 310 tend to change their orientations in response to the electric field such that their long axes are perpendicular to the field direction.

The cutouts 91-92b and 71-72b of the electrodes 190 and 270 and the edges of the pixel electrodes 190 distort the electric field to have a horizontal component that is substantially perpendicular to the edges of the cutouts 91-92b and 71-72b and the edges of the pixel electrodes 190. Accordingly, the LC molecules on each sub-area are tilt in a direction by the horizontal component and the azimuthal distribution of the tilt directions are localized to four directions, thereby increasing the viewing angle of the LCD.

In the meantime, the LC molecules 310 are pre-tilted by the slope members 331-332b in absence of the electric field and the pre-tilt directions of the LC molecules 310 determines the tilt directions of the LC molecules 310 upon application of electric field, which coincide with the tilt directions determined by the cutouts 91-92b and 71-72b.

In addition, the slope members 331-332b having varying thickness distort the equipotential lines of the electric field, and the distortion of the equipotential lines gives the tilting force, which also coincides with the tilt directions determined by the cutouts 91-92b and 71-72b when the dielectric constant of the slope members 331-332b is lower than the LC layer 3.

Accordingly, the tilt directions of the LC molecules 310 far from the cutouts 91-92b and 71-72b and the chamfered edges of the pixel electrodes 190 are also determined to reduce the response time of the LC molecules 310.

At least one of the cutouts 91-92b and 71-72b can be substituted with protrusions (not shown) or depressions (not shown). The protrusions are preferably made of organic or inorganic material and disposed on or under the field-generating electrodes 190 or 270.

The shapes and the arrangements of the cutouts 91-92b and 71-72b may be modified.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers 12 and 22 gives maximum transmittance, the polarizers 12 and 22 can be attached such that the transmissive axes of the polarizers 12 and 22 are parallel to or perpendicular to the edges of the panels 100 and 200 and it reduces the production cost.

The response time Ttot of liquid crystal was measured for slope members having inclination angles of 1.9°, 1.8°, and 1.1°, which is illustrated as a table shown in FIG. 5. The response time Ttot of the liquid crystal includes a rising time Tr and a falling time Tf. The rising time Tr is the time for the LC molecules in absence of electric field to respond to an electric field generated by applying a maximum voltage Vw to a pixel electrode, and the falling time Tf is the time for the LC molecules subjected to the maximum electric field to return to their initial states after applying a minimum voltage Vb to the pixel electrode.

In the table shown in FIG. 5, "Cell gap" indicates the thickness of the LC layer 3, i.e., the distance between the panels 100 and 200.

As shown in FIG. 5, the measured response times are equal to 13.95 ms, 14.88 ms, and 15.34 ms, which are lower than 16 ms, while the response time for a conventional LCD without slope member was about 21-25 ms. In addition, the rising time Tr and the response time Ttot were reduced as the inclination angle of the slope member increases. The measured response times lower than 16 ms enable the realization of motion images since it is required to display 60 frames of images in one second for motion images.

An LCD according to another embodiment of the present invention will be described in detail with reference to FIGS. 6 and 7.

Figure 6:
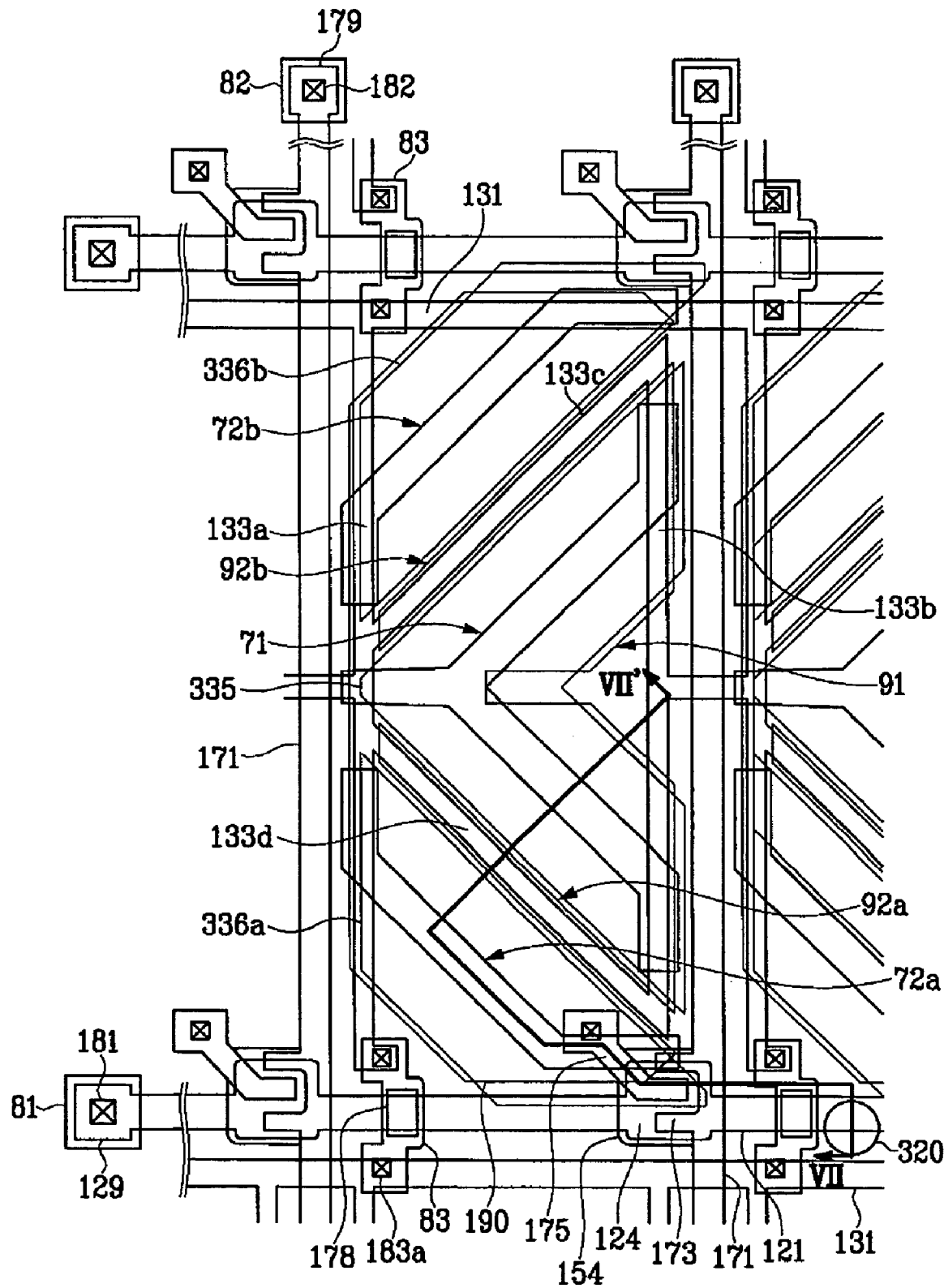
FIG. 6 is a layout view of an LCD according to another embodiment of the present invention.
Figure 7:
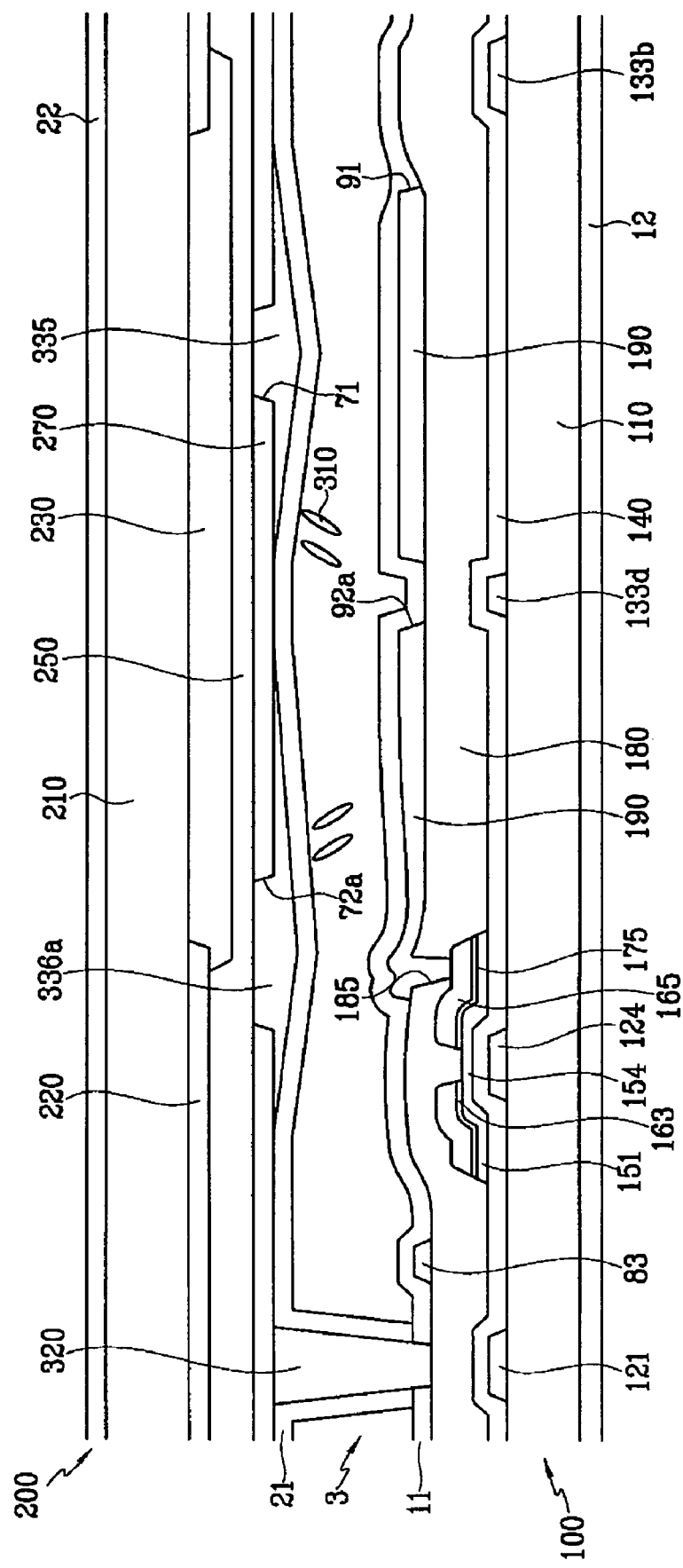
FIG. 7 is a sectional view of the LCD shown in FIG. 6 taken along the line VII-VII'.

FIG. 6 is a layout view of an LCD according to another embodiment of the present invention, and FIG. 7 is a sectional view of the LCD shown in FIG. 6 taken along the line VII-VII'.

Referring to FIGS. 6 and 7, an LCD according to this embodiment also includes a TFT array panel 100, a common electrode panel 200, a LC layer 3 and a plurality of columnar spacers 320 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-4.

Regarding the TFT array panel 100, a plurality of gate lines 121 including gate electrodes 124 and end portions 129 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 178 are formed on the ohmic contacts 161 and 165, and a passivation layer 180 is formed thereon. A plurality of contact holes 181, 182, 183a, 183b and 185 are provided at the passivation layer 180 and the gate insulating layer 140. A plurality of pixel electrodes 190 having a plurality of cutouts 91-92b, a plurality of contact assistants 81 and 82, and a plurality of overpasses 83 are formed on the passivation layer 180, and an alignment layer 11 is coated thereon.

Regarding the common electrode panel 200, a light blocking member 220, a plurality of color filters 230, an overcoat 250, a common electrode 270 having a plurality of cutouts 71-72b, and an alignment layer 21 are formed on an insulating substrate 210.

Different from the LCD shown in FIGS. 1-4, the common electrode panel 200 includes a plurality of sets of slope members 335, 336a and 336b disposed on the common electrode 270 and the overcoat 250, while the TFT array panel 100 has no slope member. Like the slope members 331-333b, the slope members 335, 336a and 336b are preferably made of insulator. Each set of the slope members 335-336b includes three slope members 335-336b facing a pixel electrode 190. Each of the slope members 335-336b has principal edges parallel to oblique edges of the cutouts 71-72b and disposed opposite each other with respect to the cutouts 71-72b and secondary edges parallel to the gate lines 121 or the data lines 171 such that it has a planar shape of trapezoid or chevron. Each of the slope members 335-336b has a ridge, which is disposed approximately on center lines of the oblique portions of the cutouts 71-72b and extends therealong, and inclined surfaces that have heights decreasing from the ridge to the principal edges. The inclination angle θ of the inclined surfaces relative to the surface of the substrate 210 is in a range of about 1-10 degrees.

In addition, the semiconductor stripes 151 of the TFT array panel 100 according to this embodiment have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Furthermore, the TFT array panel 100 further includes a plurality of semiconductor islands (not shown) and a plurality of ohmic contact islands (not shown) disposed thereon, which are disposed on the metal pieces 178.

A manufacturing method of the TFT array panel according to an embodiment simultaneously forms the data lines 171, the drain electrodes 175, the metal pieces 178, the semiconductors 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171, the drain electrodes 175, and the metal pieces 172 and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-4 may be appropriate to the TFT array panel shown in FIGS. 6 and 7.

An LCD according to another embodiment of the present invention will be described in detail with reference to FIGS. 8-10.

Figure 8:
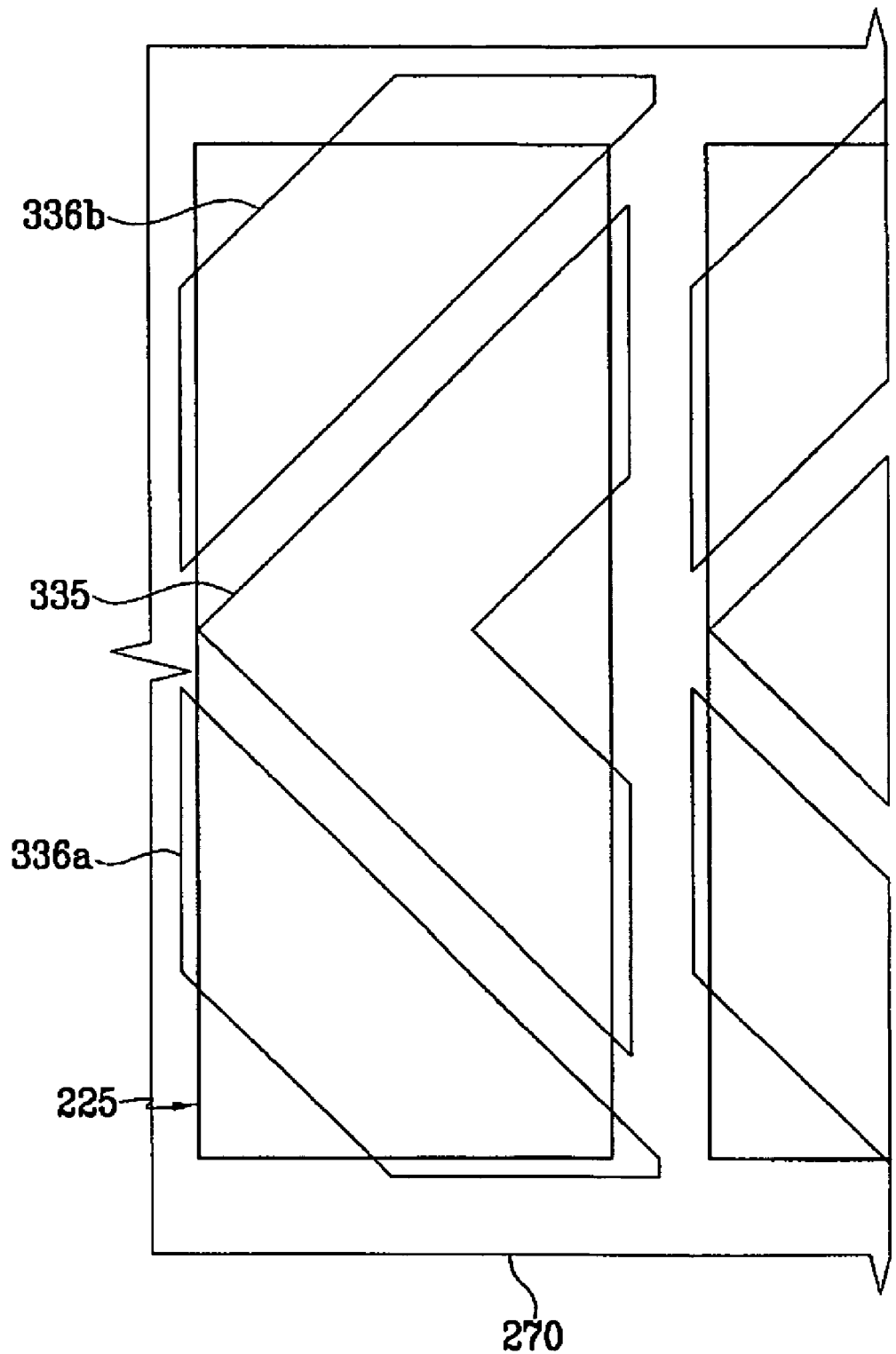
FIG. 8 is a layout view of a common electrode panel for an LCD according to another embodiment of the present invention.
Figure 9:
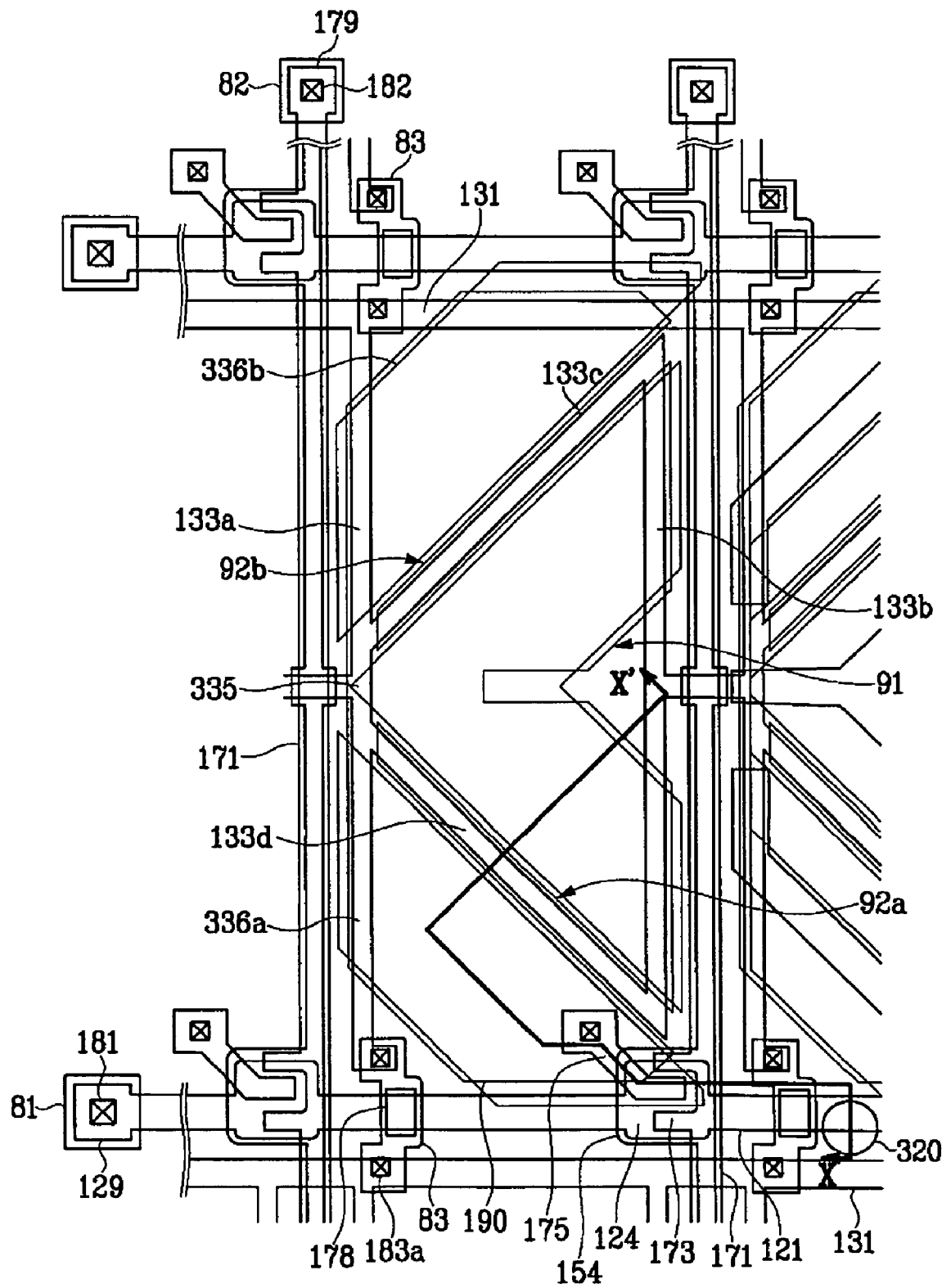
FIG. 9 is a layout view of an LCD including the TFT array panel shown in FIG. 1 and the common electrode panel shown in FIG. 8.
Figure 10:
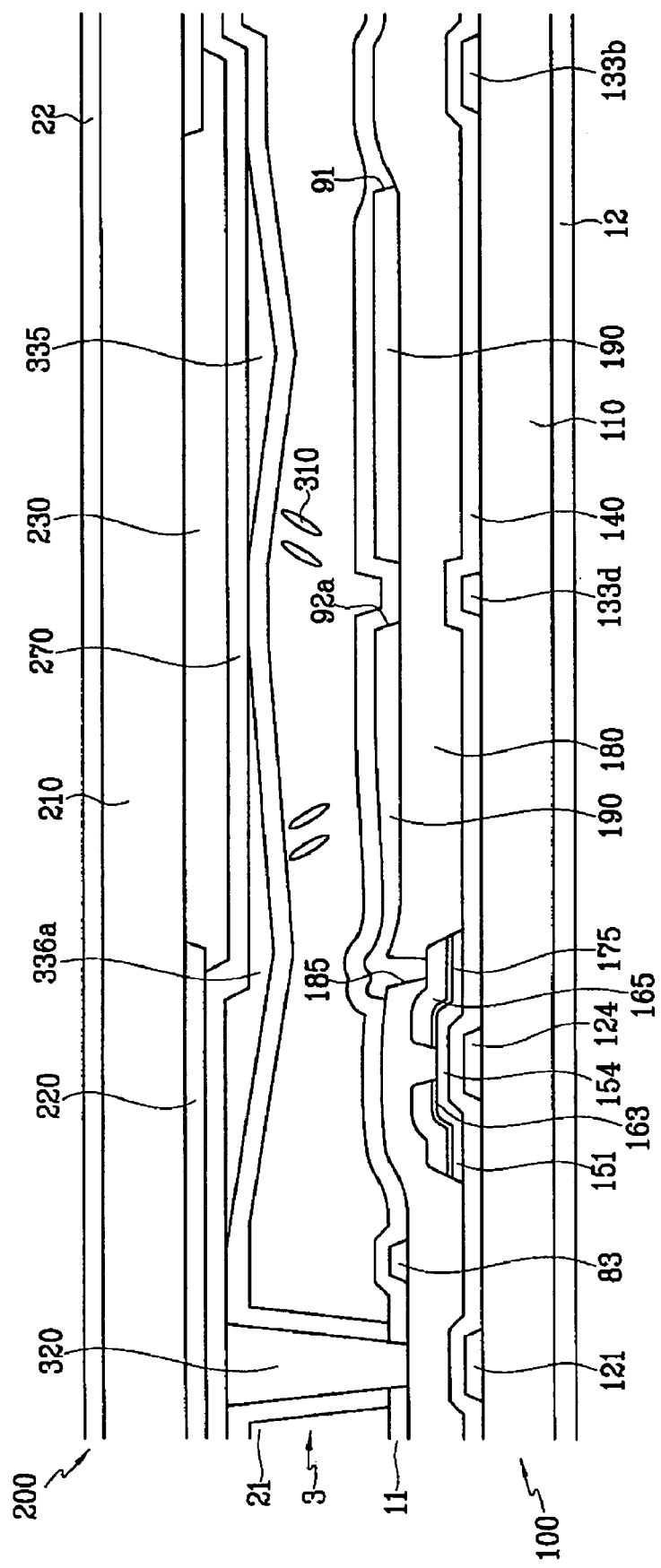
FIG. 10 is a sectional view of the LCD shown in FIG. 9 taken along the line X-X'.

FIG. 8 is a layout view of a common electrode panel for an LCD according to another embodiment of the present invention, FIG. 9 is a layout view of an LCD including the TFT array panel shown in FIG. 1 and the common electrode panel shown in FIG. 8, and FIG. 10 is a sectional view of the LCD shown in FIG. 9 taken along the line X-X'.

Referring to FIGS. 8-10, an LCD according to this embodiment also includes a TFT array panel 100, a common electrode panel 200, a LC layer 3 and a plurality of columnar spacers 320 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-4.

Regarding the TFT array panel 100, a plurality of gate lines 121 including gate electrodes 124 and end portions 129 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 178 are formed on the ohmic contacts 161 and 165, and a passivation layer 180 is formed thereon. A plurality of contact holes 181, 182, 183a, 183b and 185 are provided at the passivation layer 180 and the gate insulating layer 140. A plurality of pixel electrodes 190 having a plurality of cutouts 91-92b, a plurality of contact assistants 81 and 82, and a plurality of overpasses 83 are formed on the passivation layer 180, and an alignment layer 11 is coated thereon.

Regarding the common electrode panel 200, a light blocking member 220 having a plurality of openings 225, a plurality of color filters 230, an overcoat 250, a common electrode 270, and an alignment layer 21 are formed on an insulating substrate 210.

Different from the LCD shown in FIGS. 1-4, the common electrode panel 200 includes a plurality of sets of slope members 335, 336a and 336b disposed on the common electrode 270 and the overcoat 250, while the TFT array panel 100 has no slope member. Like the slope members 331-333b, the slope members 335, 336a and 336b are preferably made of insulator. Each set of the slope members 335-336b includes three slope members 335-336b facing a pixel electrode 190. Each of the slope members 335-336b has principal edges parallel to edges of the cutouts 91-92b and the chamfered left edges of the pixel electrode 190 and facing the cutouts 91-92b or the chamfered edges of the pixel electrode 190 and secondary edges parallel to the gate lines 121 or the data lines 171 such that it has a planar shape of trapezoid or chevron. Each of the slope members 335-336b has a ridge, which is substantially equidistant from the principal edges thereof and extends parallel to the principal edges, and inclined surfaces that have heights decreasing from the ridge to the principal edges. The height of the ridge is in a range of about 0.5-2.0 microns and inclination angle θ of the inclined surfaces relative to the surface of the substrate 210 is in a range of about 1-10 degrees. It is preferable that a set of the slope members 335-336b occupy an area equal to or larger than half of a pixel electrode 190.

In addition, the common electrode 270 has no cutout and thus there is no overcoat although the omission of the overcoat is optional.

Although there is no cutout at the common electrode panel, the slope members 335-336b can sufficiently play a role of determining tilt directions along with the cutouts 91-92b of the pixel electrodes 190.

The omission of the cutout removes a lithography step for forming cutouts at the common electrode 270. In addition, the omission of the cutout prevents the accumulation of charge carriers at particular places, which may move to the polarizers 12 and 22 to damage the polarizers 12 and 22, thereby enabling to omit an ESD treatment for preventing the damage of the polarizers 12 and 22. Therefore, the omission of the cutout along with the omission of the overcoat remarkably reduces the cost for manufacturing the LCD.

Many of the above-described features of the LCD shown in FIGS. 1-4 may be appropriate to the TFT array panel shown in FIGS. 8-10.

The response time was measured for slope members that are provided on a common electrode panel 200 and have an inclination angle of about 2 degrees when the maximum and minimum voltages were 7V and 1V, respectively.

The rising time and the falling time were about 6.5 ms and about 6.3 ms and the response time was 12.8 ms. This shows that the rising time is remarkably decreased and is almost equal to the falling time. Accordingly, the asymmetry between the rising time and the falling time is removed.

An LCD according to another embodiment of the present invention will be described in detail with reference to FIGS. 11 and 12.

Figure 11:
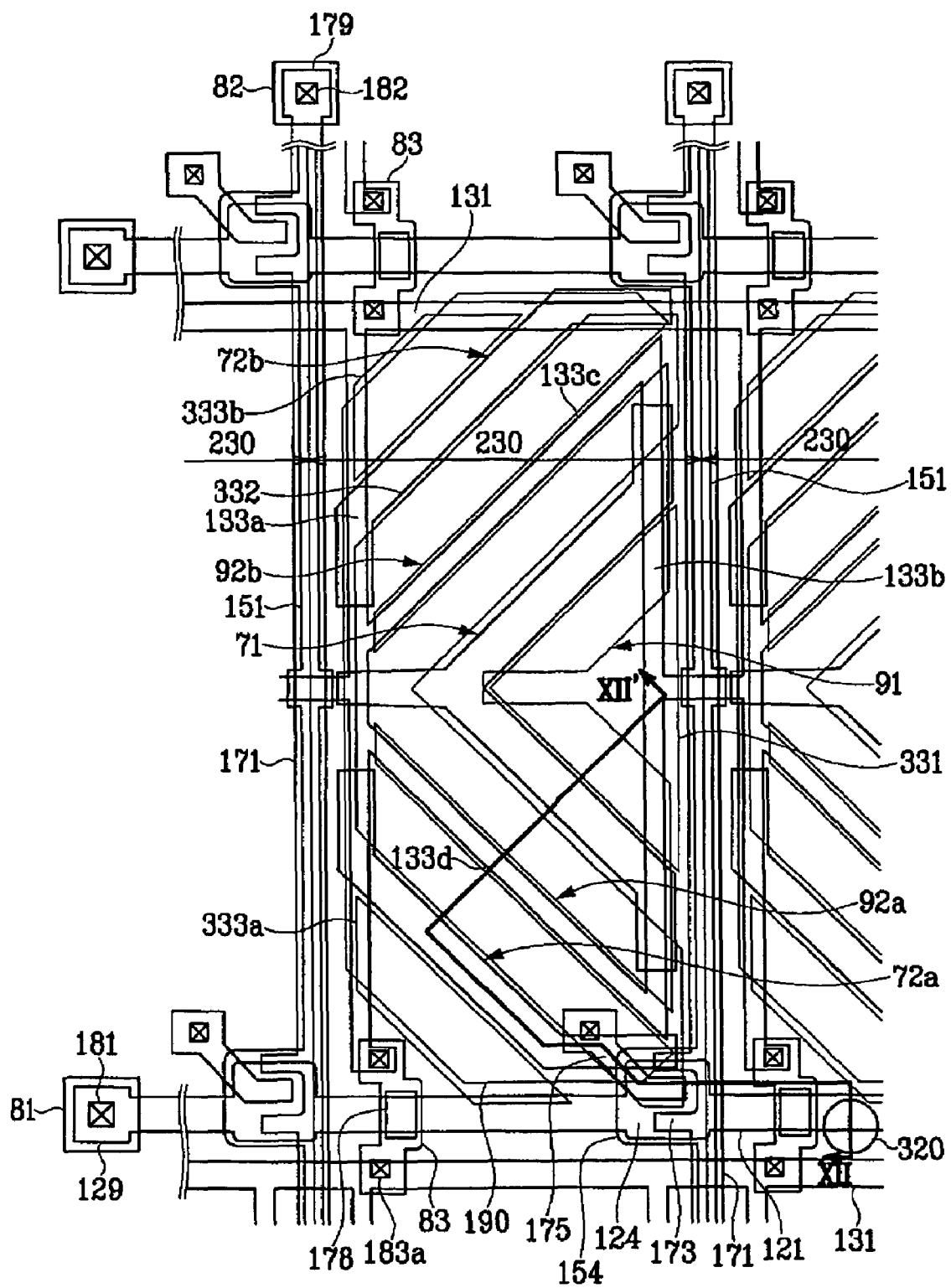
FIG. 11 is a layout view of an LCD according to another embodiment of the present invention.
Figure 12:
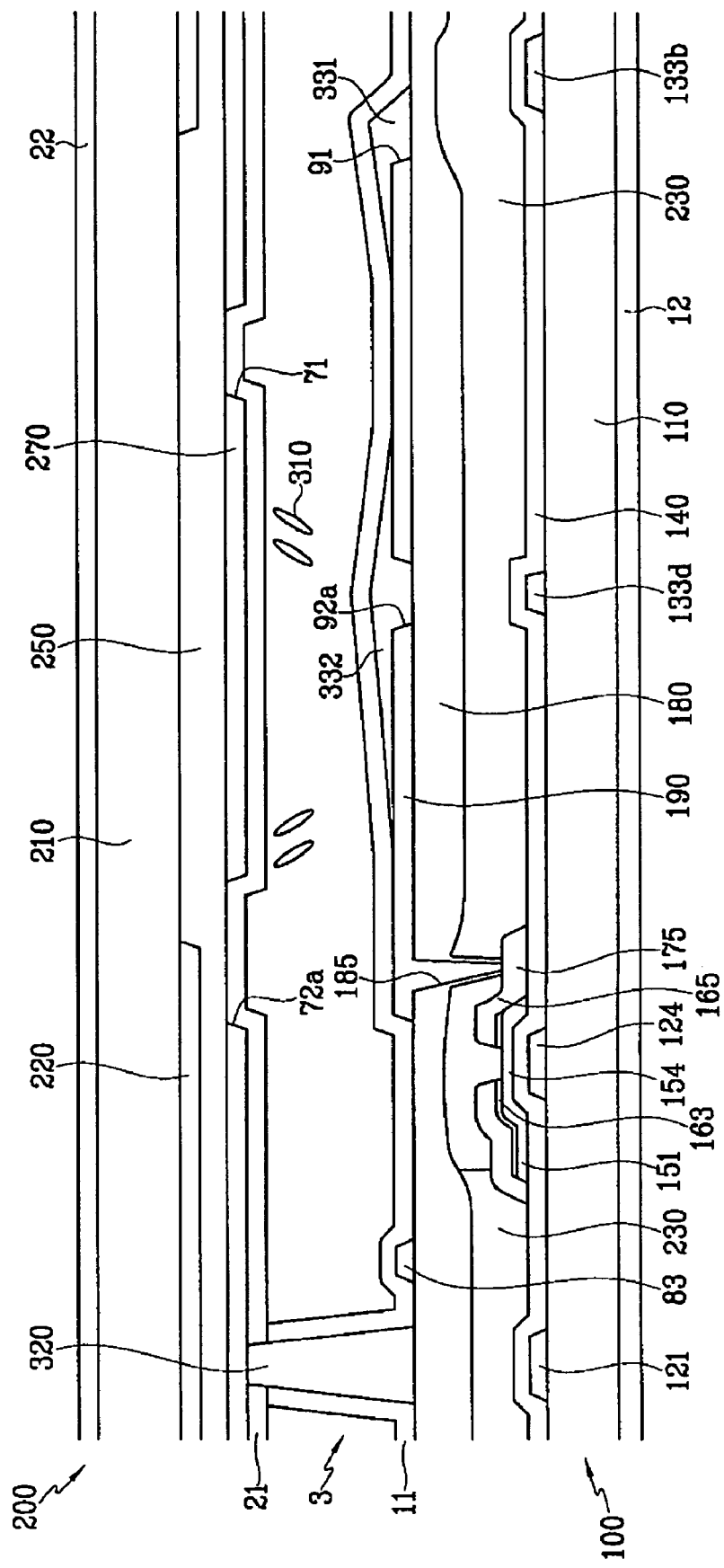
FIG. 12 is a sectional view of the LCD shown in FIG. 11 taken along the line XII-XII'.

FIG. 11 is a layout view of an LCD according to another embodiment of the present invention, and FIG. 12 is a sectional view of the LCD shown in FIG. 11 taken along the is line XII-XII'.

Referring to FIGS. 11 and 12, an LCD according to this embodiment also includes a TFT array panel 100, a common electrode panel 200, a LC layer 3 and a plurality of columnar spacers 320 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-4.

Regarding the TFT array panel 100, a plurality of gate lines 121 including gate electrodes 124 and end portions 129 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 178 are formed on the ohmic contacts 161 and 165, and a passivation layer 180 is formed thereon. A plurality of contact holes 181, 182, 183a, 183b and 185 are provided at the passivation layer 180 and the gate insulating layer 140, and a plurality of pixel electrodes 190 having a plurality of cutouts 91-92b, a plurality of contact assistants 81 and 82, and a plurality of overpasses 83 are formed on the passivation layer 180. A plurality of slope members 331-333b are formed on the pixel electrodes 190 and an alignment layer 11 is coated thereon.

Regarding the common electrode panel 200, a light blocking member 220, a plurality of color filters 230, an overcoat 250, a common electrode 270 including a plurality of cutouts 71-72b, and an alignment layer 21 are formed on an insulating substrate 210.

Different from the LCD shown in FIGS. 1-4, the TFT array panel 100 includes a plurality of color filter stripes 230 disposed under the passivation layer 180, while the TFT array panel 100 has no color filter. The color filter stripes 230 extend along a longitudinal direction and edges of adjacent two of the color filter stripes 230 exactly match with each other on the data lines 171, but the color filters 230 may overlap each other to block the light leakage between the pixel electrodes 190, or may be spaced apart from each other. When the color filters 230 overlap each other, a light blocking member 220 disposed on a common electrode panel 200 may be omitted.

Many of the above-described features of the LCD shown in FIGS. 1-4 may be appropriate to the TFT array panel shown in FIGS. 11 and 12.

Now, a manufacturing method of a common electrode panel including slope members according to an embodiment of the present invention will be described in detail with reference to FIGS. 13 and 14.

Figure 13:
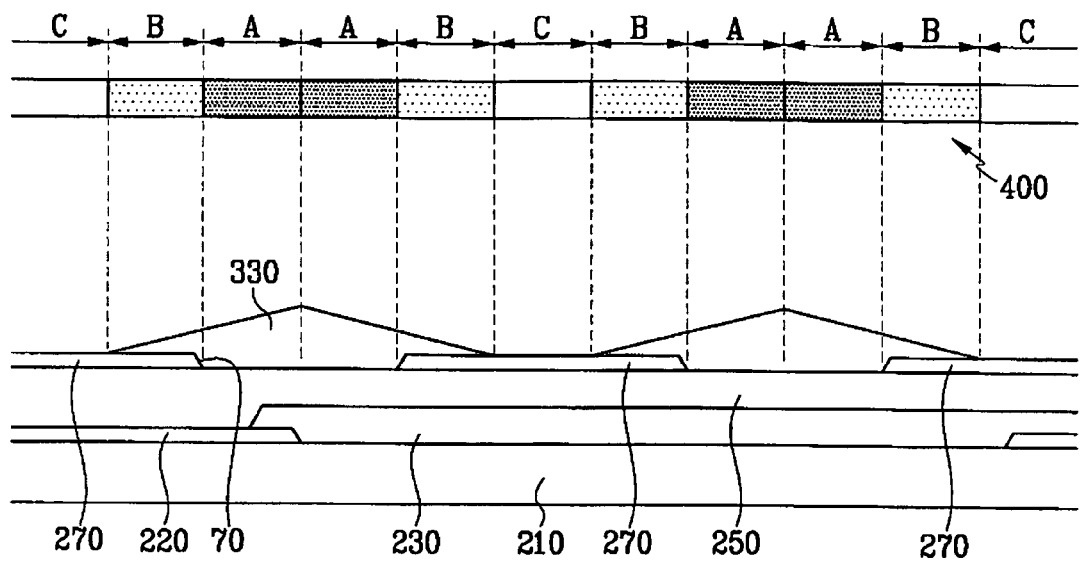
FIG. 13 is a sectional view of a common electrode panel and a mask for forming slope members in an intermediate step of a manufacturing method thereof according to an embodiment of the present invention.
Figure 14:
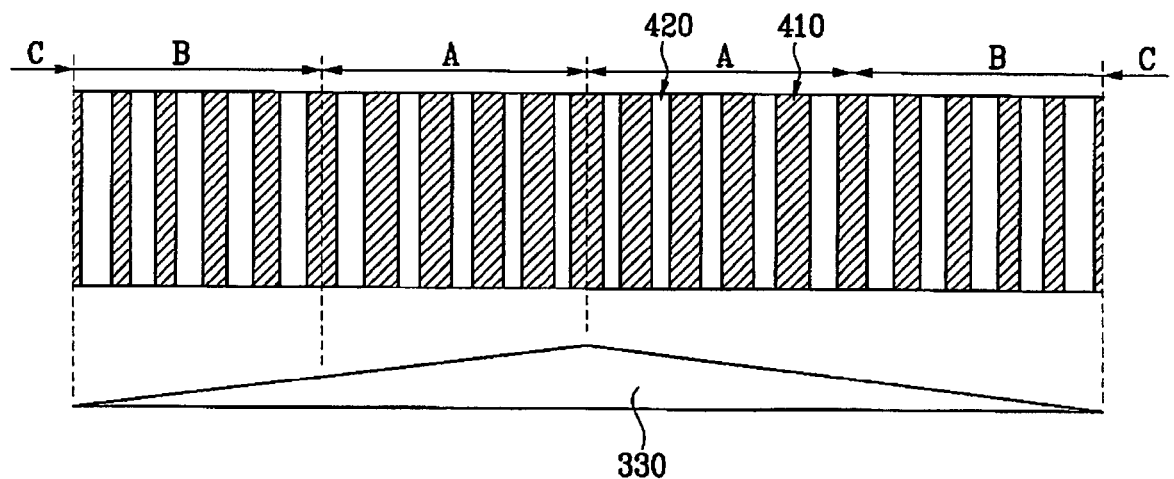
FIG. 14 illustrates slits of the mask aligned with a slope member.

FIG. 13 is a sectional view of a common electrode panel and a mask for forming slope members in an intermediate step of a manufacturing method thereof according to an embodiment of the present invention and FIG. 14 illustrates slits of the mask aligned with a slope member.

Referring to FIG. 13, a light blocking member 220, a plurality of color filters 230, and an overcoat 250 are formed in sequence on an insulating substrate 210. The light blocking member 220 is preferably made of organic material containing black pigment or Cr or Cr oxide, and the overcoat 250 is preferably made of inorganic or organic insulator. The color filters 230 may be formed, for example, by sequentially coating, light-exposing, and developing negative photosensitive organic material containing red, green, and blue pigments. Subsequently, an ITO or IZO layer is deposited on the overcoat 250 and pattern to form a common electrode 270 having a plurality of cutouts 70. The cutouts 70 may be omitted as described above with reference to FIGS. 8-10.

Next, a photosensitive organic insulating layer is coated on the common electrode 270, subjected to light exposure through a mask 400, and developed to form a plurality of slope members 330. The mask 400 includes light transmitting areas C substantially fully transmitting incident light and translucent areas A and B partly transmitting incident light. Referring to FIG. 14, the translucent areas A and B include a plurality of light blocking members 410 spaced apart from each other to define a plurality of slits 420 therebetween. The width of the slits 420 and the distance between the slits 420 are preferably lower than resolution of an exposer used in the light exposure. The light transmittance of the translucent areas A and B gradually increases from a center to edges of the translucent areas A and B. For example, in a translucent area A, the width of the light blocking members 410 is fixed in a range of about 1.0-2.5 microns and the width of the slits 420 gradually increases from a center to both edges of the translucent area A. On the contrary, the width of the slits 420 is fixed in a range of about 1.0-2.5 microns in a translucent area B and the width of the light blocking members 410 gradually decreases from a center to both edges of the translucent area B.

The above-described method enabled to obtain a uniform inclination angle θ of the slope members 330 and to realize a uniform, reproducible manufacturing process. The thickness of the slope members 330 preferably has a maximum value of about 1.5 microns in consideration of the transmittance of the slope members 330, the inclination angle of the slope members 330 is preferably in a range of about 1.2-3.0 degrees, and the width of the slope members 330 can be varied depending on the width of domains.

Figure 15:
FIG. 15 illustrates a slope member according to another embodiment of the present invention.

Meanwhile, the slope members 330 may have a curved surface as shown in FIG. 15, which illustrates a slope member according to another embodiment of the present invention.

Referring to FIG. 15, the slope member 330 has an inclination angle β from its center to portions near its edges, but it has another inclination angle α larger than β near its edges. The inclination angles α and β are preferably equal to or lower than about 5 and 10 degrees, respectively.

An LCD according to another embodiment of the present invention is described in detail with reference to FIGS. 16-20.

Figure 16:
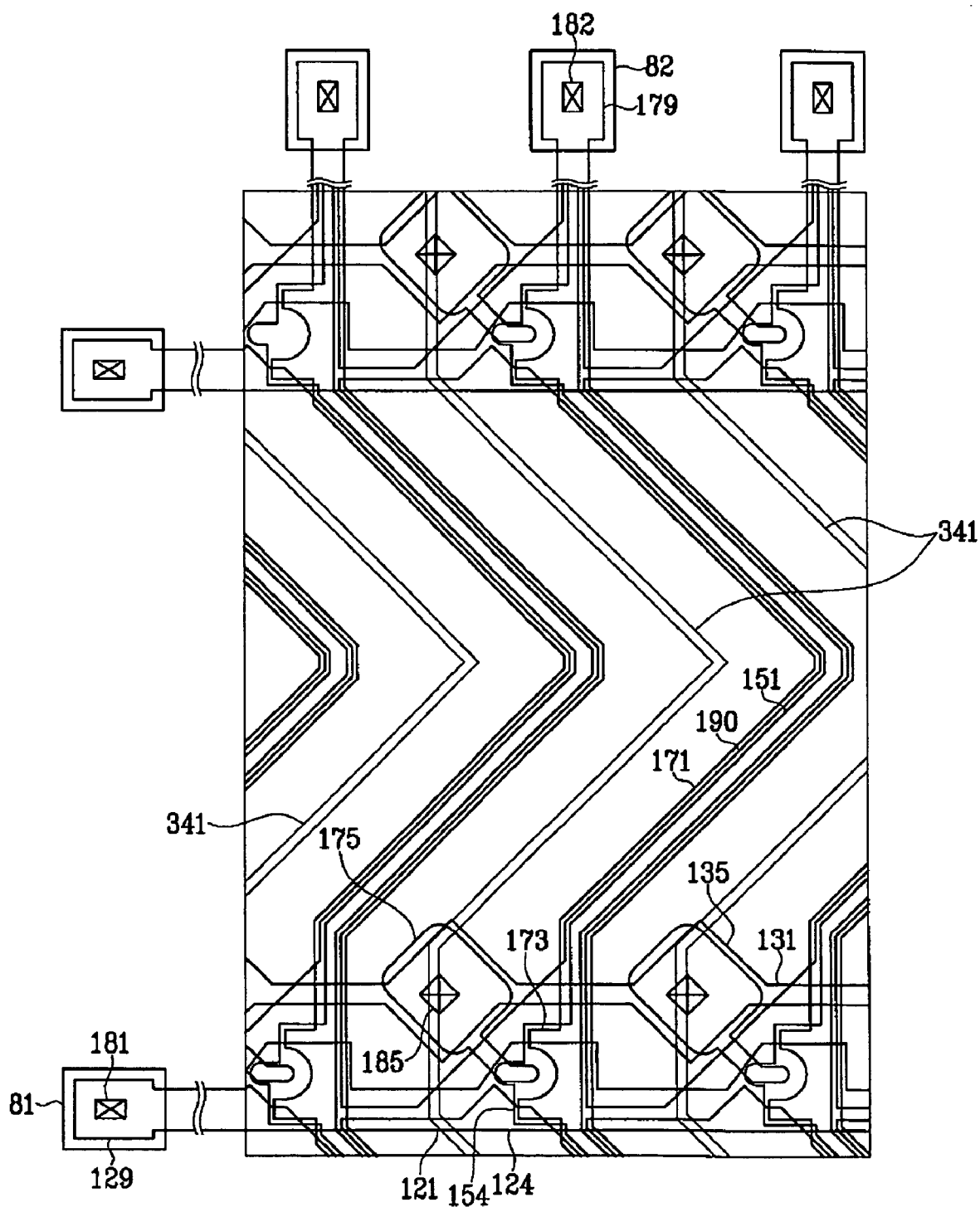
FIG. 16 is a layout view of a TFT array panel for an LCD according to an embodiment of the present invention.
Figure 17:
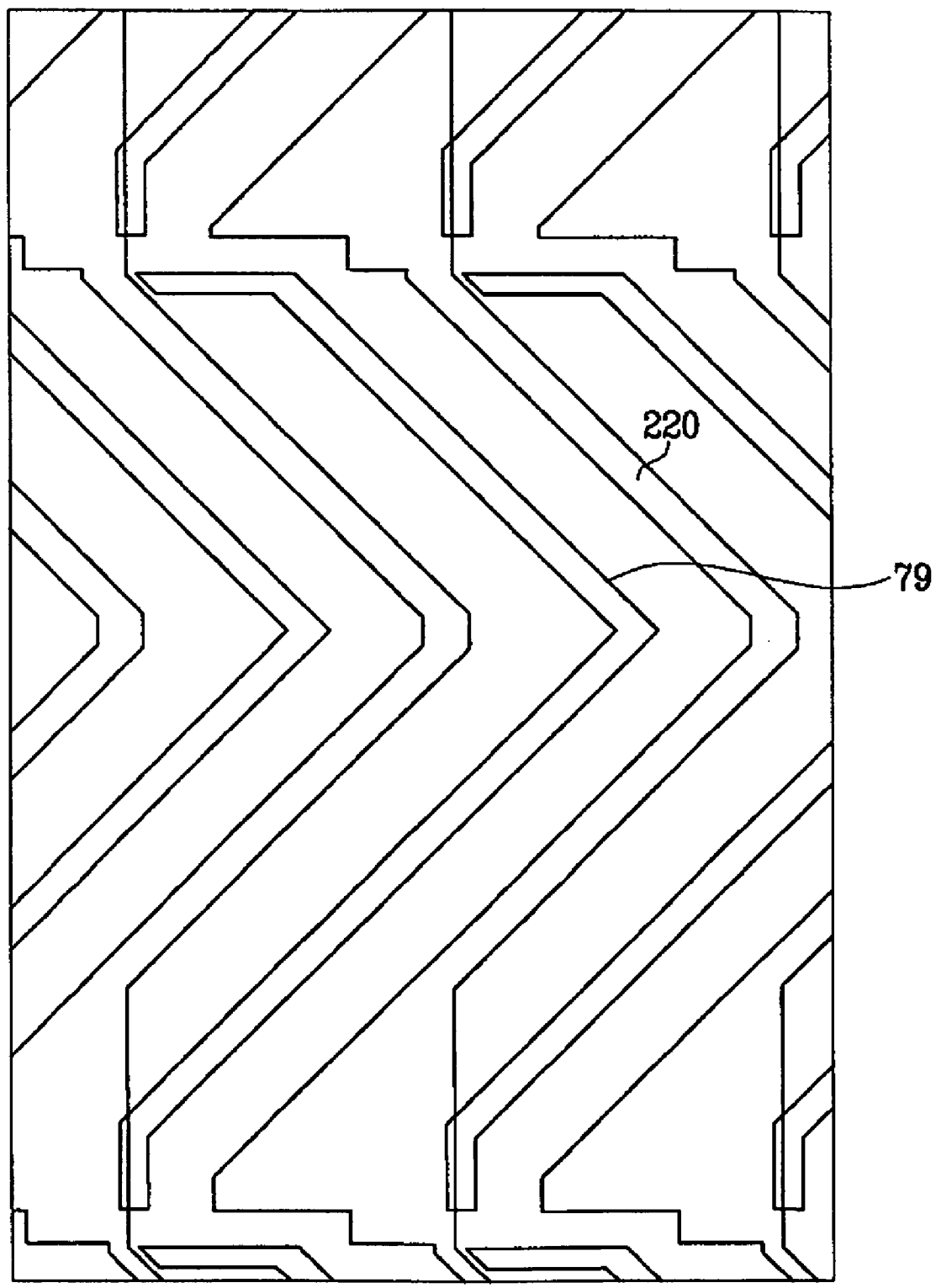
FIG. 17 is a layout view of a common electrode panel for an LCD according to an embodiment of the present invention.
Figure 18:
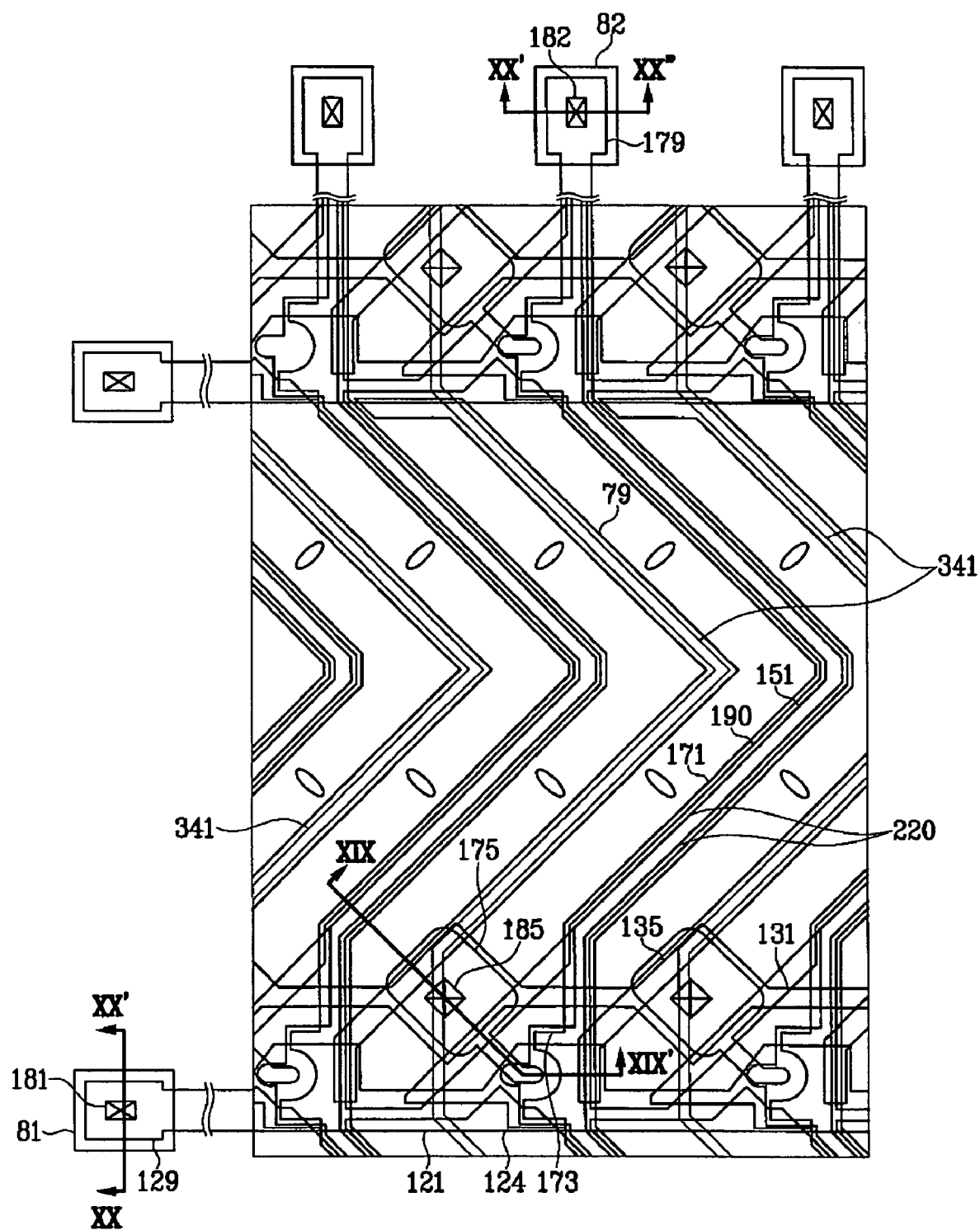
FIG. 18 is a layout view of an LCD including the TFT array panel shown in FIG. 16 and the common electrode panel shown in FIG. 17.
Figure 19:
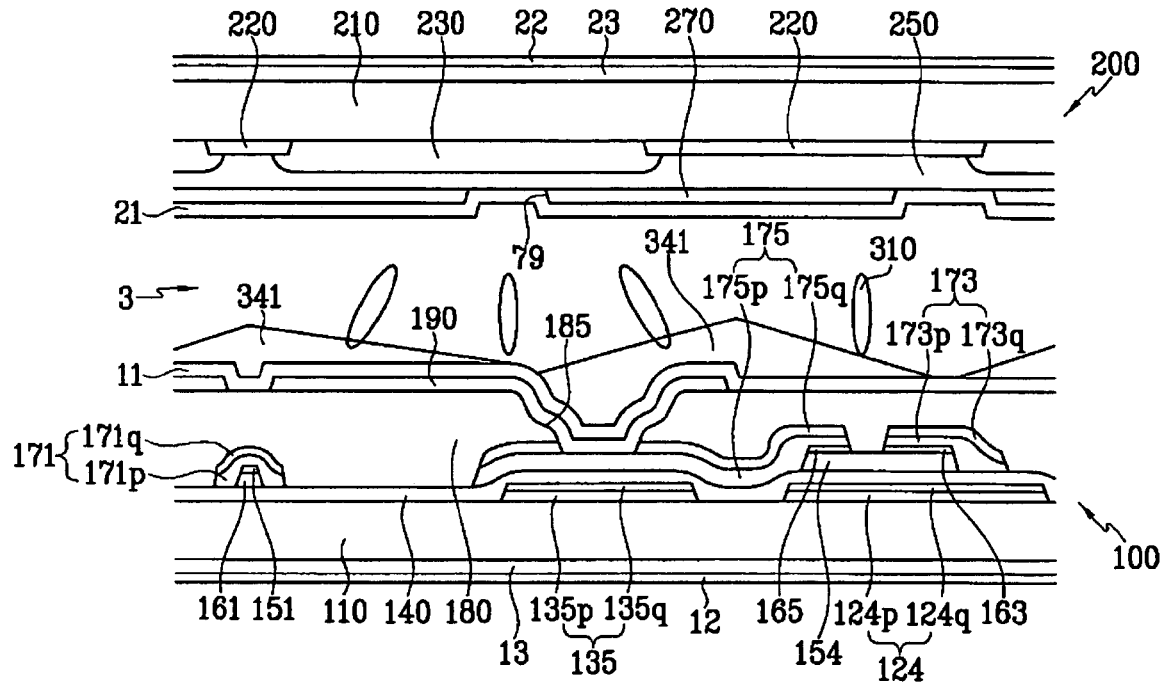
FIG. 19 is a sectional view of the LCD shown in FIG. 18 taken along the line XIX-XIX'.
Figure 20:
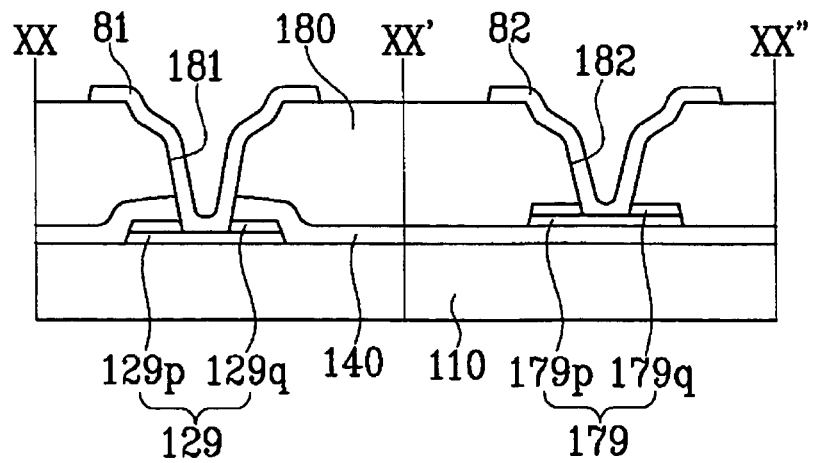
FIG. 20 is a sectional view of the LCD shown in FIG. 18 taken along the lines XX-XX' and XX'-XX"

FIG. 16 is a layout view of a TFT array panel for an LCD according to an embodiment of the present invention, FIG. 17 is a layout view of a common electrode panel for an LCD according to an embodiment of the present invention, FIG. 18 is a layout view of an LCD including the TFT array panel shown in FIG. 16 and the common electrode panel shown in FIG. 17, FIG. 19 is a sectional view of the LCD shown in FIG. 18 taken along the line XIX-XIX', and FIG. 20 is a sectional view of the LCD shown in FIG. 18 taken along the lines XX-XX' and XX".

An LCD according to an embodiment of the present invention includes a TFT array panel 100, a common electrode panel 200 facing the TFT array panel 100, and a LC layer 3 interposed between the TFT array panel 100 and the common electrode panel 200.

The TFT array panel 100 is now described in detail with reference to FIGS. 16, 18-20.

A plurality of gate lines 121 and a plurality of storage electrode lines 131 are formed on an insulating substrate 110.

The gate lines 121 for transmitting gate signals extend substantially in a transverse direction and they are separated from each other. Each gate line 121 includes a plurality of projections forming a plurality of gate electrodes 124 and an end portion 129 having a large area for contact with another layer or an external device. The end portions 129 may not be provided when a gate driving circuit (not shown) is integrated on the substrate 110 such that the gate lines 121 in direct contact with the gate driving circuit.

Each storage electrode line 131 extends substantially in the transverse direction and includes a plurality of projections forming storage electrodes 135. Each storage electrode 135 has a shape of a diamond or a rectangle rotated by about 45 degrees and they are located close to the gate lines 121. The storage electrode lines 131 are supplied with a predetermined voltage such as a common voltage, which is applied to a common electrode 270 on the common electrode panel 200 of the LCD.

The gate lines 121 and the storage electrode lines 131 have a multi-layered structure including two films having different physical characteristics, a lower film and an upper film. The upper film is preferably made of low resistivity metal including Al containing metal, Ag containing metal, or Cu containing metal for reducing signal delay or voltage drop in the gate lines 121 and the storage electrode lines 131. On the other hand, the lower film is preferably made of material such as Mo containing metal, Cr, Ta, or Ti, which has good physical, chemical, and electrical contact characteristics with other materials such as ITO or IZO. A good exemplary combination of the lower film material and the upper film material is Cr and Al—Nd alloy. In FIGS. 19 and 20, the lower and the upper films of the gate electrodes 124 are indicated by reference numerals 124$p$ and 124$q$, respectively, the lower and the upper films of the end portions 129 are indicated by reference numerals 129$p$ and 129$q$, respectively, and the lower and the upper films of the storage electrodes 135 are indicated by reference numerals 135$p$ and 135$q$, respectively. The upper film 252 of the end portions 129 of the gate lines 121 are removed at least in part to expose the lower films 129$p$.

The gate lines 121 and the storage electrode lines 131 may have a single layer structure or may include three or more layers.

In addition, the lateral sides of the gate lines 121 and the storage electrode lines 131 are inclined relative to a surface of the substrate 110, and the inclination angle thereof ranges about 30-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated as "a-Si") or polysilicon are formed on the gate insulating layer 140. Each semiconductor stripe 151 extends substantially in the longitudinal direction while it is curved periodically. Each semiconductor stripe 151 has a plurality of projections 154 branched out toward the gate electrodes 124.

A plurality of ohmic contact stripes and islands 161 and 165 preferably made of silicide or n+hydrogenated a-Si heavily doped with n type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110, and the inclination angles thereof are preferably in a range between about 30-80 degrees.

A plurality of data lines 171 and a plurality of drain electrodes 175 separated from each other are formed on the ohmic contacts 161 and 165 and the gate insulating layer 140.

The data lines 171 for transmitting data voltages extend substantially in the longitudinal direction and intersect the gate lines 121 and the storage electrode lines 131. Each data line 171 has an end portion 179 having a large area for contact with another layer or an external device and it includes a plurality of pairs of oblique portions and a plurality of longitudinal portions such that it curves periodically. A pair of oblique portions are connected to each other to form a chevron and opposite ends of the pair of oblique portions are connected to respective longitudinal portions. The oblique portions of the data lines 171 make an angle of about 45 degrees with the gate lines 121, and the longitudinal portions cross over the gate electrodes 124. The length of a pair of oblique portions is about one to nine times the length of a longitudinal portion, that is, it occupies about 50-90 percents of the total length of the pair of oblique portions and the longitudinal portion. A pair of oblique portions may be substituted with three or more oblique portions such that a part of a data line 171 between adjacent two longitudinal portions are curved twice or more.

Each drain electrode 175 includes a rectangular or rhombic expansion overlapping a storage electrode 135. The edges of the expansion of the drain electrode 175 are substantially parallel to the edges of the storage electrodes 135. Each longitudinal portion of the data lines 171 includes a plurality of projections such that the longitudinal portion including the projections forms a source electrode 173 partly enclosing an end portion of a drain electrode 175 disposed opposite the expansion. Each set of a gate electrode 124, a source electrode 173, and a drain electrode 175 along with a projection 154 of a semiconductor stripe 151 form a TFT having a channel formed in the semiconductor projection 154 disposed between the source electrode 173 and the drain electrode 175.

The data lines 171 and the drain electrodes 175 also include a lower film 171$p$ and 175$p$ preferably made of Mo, Mo alloy, Cr, Ta, or Ti and an upper film 171$q$ and 175$q$ located thereon and preferably made of Al containing metal, Ag containing metal, or Cu containing metal. In FIGS. 4 and 5, the lower and the upper films of the source electrodes 173 are indicated by reference numerals 173$p$ and 173$q$, respectively, and the lower and the upper films of the end portions 179 of the data lines 171 are indicated by reference numerals 179$p$ and 179$q$, respectively. The upper films 179$q$, 175$q$ of the end portions 179 of the data lines 171 and the drain electrodes 175 are removed at least in part to expose the lower films 179$p$ and 175$p$.

Like the gate lines 121 and the storage electrode lines 131, the data lines 171 and the drain electrodes 175 have inclined lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween.

A passivation layer 180 is formed on the data lines 171 and the drain electrodes 175, and exposed portions of the semiconductor stripes 151, which are not covered with the data lines 171 and the drain electrodes 175. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide. The passivation layer 180 may have a double-layered structure including a lower inorganic film and an upper organic film in order to prevent the channel portions of the semiconductor stripes 151 from being in direct contact with organic material.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 181 exposing the end portions 129 of the gate lines 121. The above-described exposed portions of the lower films 129$p$, 179$p$ and 175$p$ are exposed through the contact holes 181, 182 and 185, respectively. The contact holes 181, 182 and 185 can have various shapes such as polygon or circle. The area of each contact hole 181 or 182 is preferably equal to or larger than 0.5 mm×15 μm and not larger than 2 mm×60 μm. The sidewalls of the contact holes 181, 182 and 185 are inclined with an angle of about 30-85 degrees or have stepwise profiles.

A plurality of pixel electrodes 190 and a plurality of contact assistants 81 and 82, which are preferably made of transparent conductive material such as ITO or IZO, are formed on the passivation layer 180. For a reflective LCD, the pixel electrodes 190 may be made of opaque reflective material such as Ag or Al.

Each pixel electrode 190 is located substantially in an area enclosed by the data lines 171 and the gate lines 121, and thus it also forms a chevron. The pixel electrodes 190 cover the storage electrode lines 131 including the storage electrodes 135 and the expansions of the drain electrodes 175 and have chamfered edges substantially parallel to edges of the storage electrodes 135 that are close to the chamfered edges.

The capacitances of the storage capacitors implemented by overlapping the pixel electrodes 190 with the storage electrode lines 131, i.e., the storage capacitances are increased by providing the projections (i.e., the storage electrodes) 135 at the storage electrode lines 131, elongating the drain electrodes 175 connected to the pixel electrodes 190, and providing the expansions at the drain electrodes 175 overlapping the storage electrodes 135 of the storage electrode lines 131 for decreasing the distance between the terminals and increasing the overlapping areas.

The pixel electrodes 190 overlap the data lines 171 as well as the gate lines 121 to increase aperture ratio.

The contact assistants 81 and 82 are connected to the exposed end portions 129 of the gate lines 121 and the exposed end portions 179 of the data lines 171 through the contact holes 181 and 182, respectively. The contact assistants 81 and 82 protect the exposed portions 129 and 179 and complement the adhesion between the exposed portions 129 and 179 and external devices. The contact assistants 81 and 82 are connected to external devices through anisotropic conductive films (ACF) (not shown), etc.

The contact assistants 81 may play a role connecting the gate lines 121 and metal layers of a gate driving circuit, if it is integrated on the TFT array panel. Similarly, the contact assistants 82 may play a role connecting the data lines 171 and metal layers of a data driving circuit, if it is integrated on the TFT array panel 100.

A plurality of slope members 341 preferably made of insulator are formed on the pixel electrodes 190 and the passivation layer 180. Each of the slope members 341 has principal edges parallel to the edges of the pixel electrodes 190 and disposed on an imaginary center line bisecting a pixel electrode 190 into left and right halves and secondary edges parallel to the gate lines 121 such that it has a planar shape of chevron. Each of the slope members 341 has a ridge disposed on a data line 171 and extending therealong and inclined surfaces having heights decreasing from the ridge to the principal edges.

Since the slope members 341 are centered at the data lines 171 and the light blocking members 220, the decrease of light transmittance that may be generated by the slope members 341 may be reduced. In addition, the slope members 341 reduce electric field generated by the data lines 171 that may distort the orientations of the LC molecules 310 to generate spots. Accordingly, the alignment margins between the data lines 171 and the pixel electrodes 190 can be increased.

Finally, an alignment layer 11 that may be homeotropic is formed on the slope members 341.

The description of the common electrode panel 200 follows with reference to FIGS. 17-19.

A light blocking member called a black matrix 220 is formed on an insulating substrate 210 such as transparent glass and it includes a plurality of oblique portions facing the oblique portions of the data lines 171 and a plurality of right-angled-triangular portions facing the TFTs and the longitudinal portions of the data lines 171 such that the light blocking member 220 prevents light leakage between the pixel electrodes 190 and defines open areas facing the pixel electrodes 190. Each of the triangular portions of the light blocking member 220 has a hypotenuse parallel to a chamfered edge of a pixel electrode 190.

A plurality of color filters 230 are formed on the substrate 210 and the light blocking member 220 and it is disposed substantially in the open areas defined by the light blocking member 220. The color filters 230 disposed in adjacent two data lines 171 and arranged in the longitudinal direction may be connected to each other to form a stripe. Each color filter 230 may represent one of three primary colors such as red, green and blue colors.

An overcoat 250 preferably made of organic material is formed on the color filters 230 and the light blocking member 220. The overcoat 250 protects the color filters 230 and has a flat top surface.

A common electrode 270 preferably made of transparent conductive material such as ITO and IZO is formed on the overcoat 250. The common electrode 270 is supplied with the common voltage and it has a plurality of chevron-like cutouts 79. Each cutout 79 includes a pair of oblique portions connected to each other, a transverse portion connected to one of the oblique portions, and a longitudinal portion connected to the other of the oblique portions. The oblique portions of the cutout 79 extend substantially parallel to the oblique portions of the data lines 171 and face a pixel electrode 190 so that they may bisect the pixel electrode 190 into left and right halves. The transverse and the longitudinal portions of the cutout 79 are aligned with transverse and longitudinal edges of the pixel electrode 190, respectively, and they make obtuse angles with the oblique portions of the cutout 79. The cutouts 79 are provided for controlling the tilt directions of the LC molecules 310 in the LC layer 3 and preferably have a width in a range between about 9-12 microns. The cutouts 79 may be substituted with protrusions formed on or under the common electrode 270, preferably made of organic material, and preferably having width ranging about 5 microns to 10 microns.

An alignment layer 21 that may be homeotropic is coated on the common electrode 270.

A pair of polarizers 12 and 22 are provided on outer surfaces of the panels 100 and 200 such that their transmissive axes are crossed and one of the transmissive axes, for example, the transmissive axis of the polarizer 12 provided on the TFT array panel 100 is parallel to the gate lines 121. The polarizer 12 may be omitted for a reflective LCD.

The LCD further includes retardation films 13 and 23 interposed between the panels 100 and 200 and the polarizers 12 and 22. The retardation films 13 and 23 have birefringence and compensate the retardation of the LC layer 3 in a reversed manner. The retardation films 13 and 23 may include uniaxial or biaxial optical films, and in particular, they may include negative uniaxial optical films.

The LCD may further include a backlight unit for providing light for the polarizers 12 and 22, the panels 100 and 200, and the LC layer 3.

The alignment layers 11 and 21 may be homogeneous alignment layers.

The LC layer 3 has negative dielectric anisotropy and the LC molecules 310 in the LC layer 3 are aligned such that their long axes are vertical to the surfaces of the panels in absence of electric field. Accordingly, incident light cannot pass the crossed polarization system 12 and 22.

Upon application of the common voltage to the common electrode 270 and a data voltage to the pixel electrodes 190, a primary electric field substantially perpendicular to the surfaces of the panels is generated. The LC molecules 310 tend to change their orientations in response to the electric field such that their long axes are perpendicular to the field direction. In the meantime, the cutouts 79 of the common electrode 270 and the edges of the pixel electrodes 190 distort the primary electric field to have a horizontal component which determines the tilt directions of the LC molecules 310. The horizontal component of the primary electric field is perpendicular to the edges of the cutouts 79 and the edges of the pixel electrodes 190. The horizontal components of the primary electric field at opposite edges of a cutout are antiparallel.

Accordingly, four sub-regions having different tilt directions, which are partitioned by edges of a pixel electrode 190, a cutout 79 bisecting the pixel electrode 190, and an imaginary transverse center line passing through the meeting point of the oblique portions of the cutout 79, are formed in a pixel region of the LC layer 3, which are located on the pixel electrode 190. Each sub-region has two major edges defined by the cutout 79 and an oblique edge of the pixel electrode 190, respectively, which are spaced apart preferably from about 10 microns to about 30 microns. The number of the sub-regions in a pixel region is preferably four if the planar area of the pixel region is smaller than about 100×300 square microns, and, if not, it is preferably four or eight. The number of the sub-regions can be varied by changing the number of the cutouts 79 of the common electrode 270, by providing cutouts at the pixel electrodes 190, or by changing the number of curved points of the edges of the pixel electrodes 190. The sub-regions are classified into a plurality of, preferably four, domains based on the tilt directions.

In the meantime, the direction of a secondary electric field due to the voltage difference between the pixel electrodes 190 is perpendicular to the edges of the cutouts 79. Accordingly, the field direction of the secondary electric field coincides with that of the horizontal component of the primary electric field. Consequently, the secondary electric field between the pixel electrodes 190 enhances the determination of the tilt directions of the LC molecules 310.

Since the LCD performs inversion such as dot inversion, column inversion, etc., adjacent pixel electrodes are supplied with data voltages having opposite polarity with respect to the common voltage and thus a secondary electric field between the adjacent pixel electrodes 190 is almost always generated to enhance the stability of the domains.

A method of manufacturing the TFT array panel shown in FIGS. 16-20 according to an embodiment of the present invention will be now described in detail with reference to FIGS. 21A, 21B, 22A and 22B as well as FIGS. 16-20.

Figure 21A:
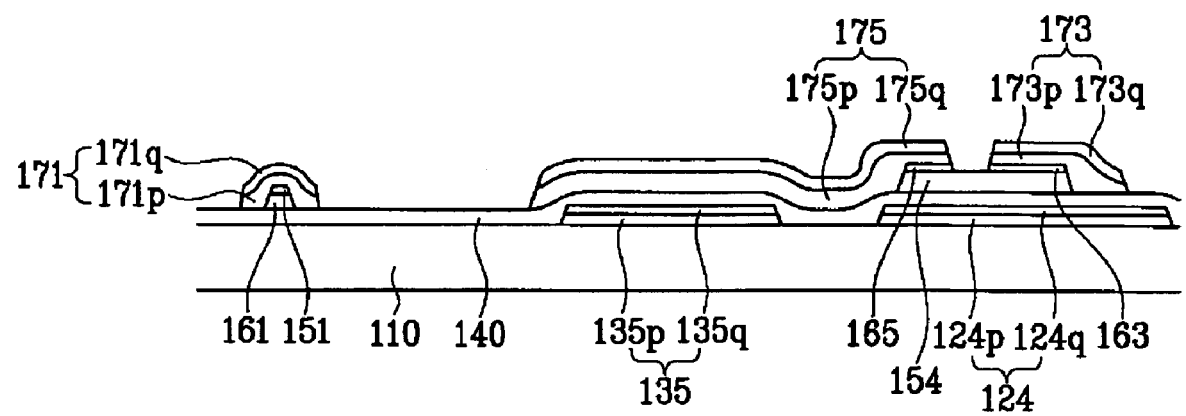
FIGS. 21A and 21B are sectional views of the TFT array panel shown in FIGS. 16 and 18-20 taken along the line XIX-XIX' and the lines XX-XX' and XX'-XX", respectively, in an intermediate step of a manufacturing method thereof according to an embodiment of the present invention.
Figure 21B:
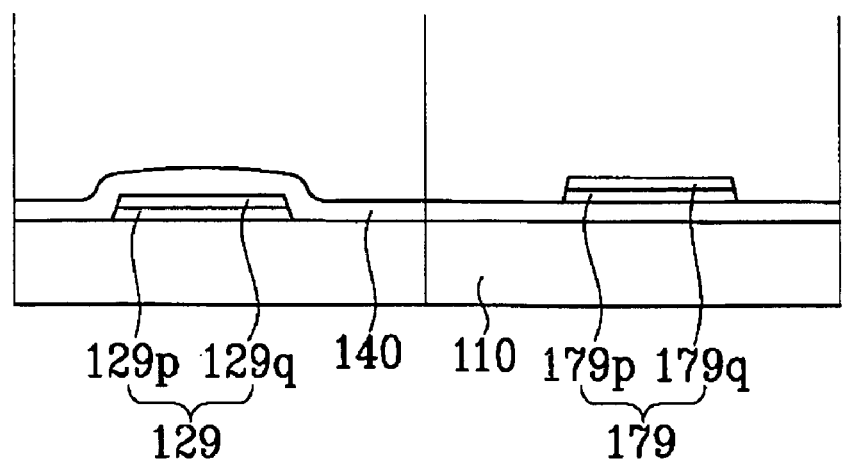
Figure 22A:
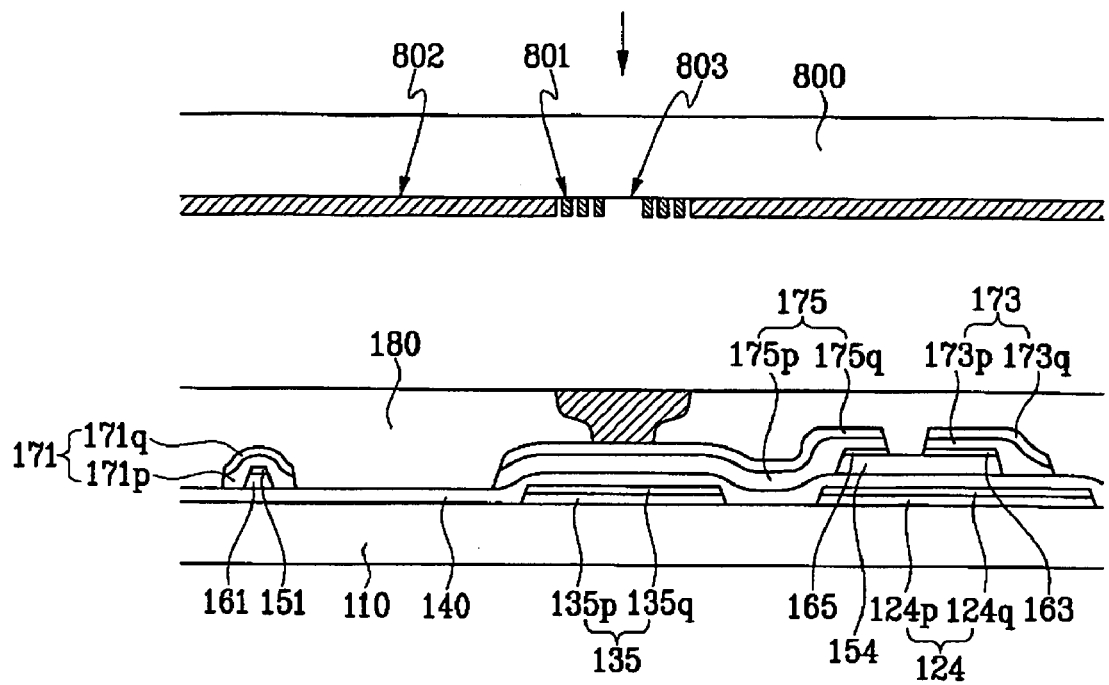
FIGS. 22A and 22B are sectional views of the TFT array panel shown in FIGS. 16 and 18-20 taken along the line XIX-XIX' and the lines XX-XX' and XX'-XX", respectively, in the step of the manufacturing method following the step shown in FIGS. 21A and 21B.
Figure 22B:
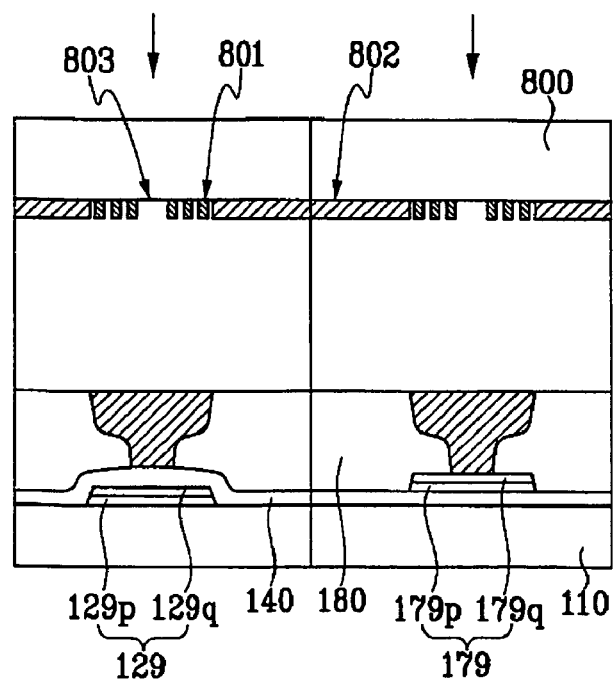

FIGS. 21A and 21B are sectional views of the TFT array panel shown in FIGS. 16 and 18-20 taken along the line XIX-XIX' and the lines XX-XX' and XX'-XX'', respectively, in an intermediate step of a manufacturing method thereof according to an embodiment of the present invention, and FIGS. 22A and 22B are sectional views of the TFT array panel shown in FIGS. 16 and 18-20 taken along the line XIX-XIX' and the lines XX-XX' and XX'-XX", respectively, in the step of the manufacturing method following the step shown in FIGS. 21A and 21B.

Referring to FIGS. 16, 21A and 21B, a lower conductive film preferably made of Cr, Mo, or Mo alloy and an upper conductive film preferably made of Al containing metal or Ag containing metal are sputtered in sequence on an insulating substrate 110 and they are wet or dry etched in sequence to form a plurality of gate lines 121 including gate electrodes 124 and end portions 129, and a plurality of storage electrode lines 131 including storage electrodes 135. In FIGS. 21A and 21B, the lower and the upper films of the gate electrodes 124 are indicated by reference numerals 124p and 124q, respectively, the lower and the upper films of the end portions 129 are indicated by reference numerals 129p and 129q, respectively, and the lower and the upper films of the storage electrodes 135 are indicated by reference numerals 135p and 135q, respectively.

After sequential deposition of a gate insulating layer 140 with thickness of about 1,500-5,000 Å, an intrinsic a-Si layer with thickness of about 500-2,000 Å, and an extrinsic a-Si layer with thickness of about 300-600 Å, the extrinsic a-Si layer and the intrinsic a-Si layer are photo-etched to form a plurality of extrinsic semiconductor stripes and a plurality of intrinsic semiconductor stripes 151 including projections 154 on the gate insulating layer 140.

Subsequently, two conductive films including a lower conductive film and an upper conductive film and having a thickness of 1,500-3,000 Å are sputtered in sequence and patterned to form a plurality of date lines 171 including source electrodes 173 and end portions 179, and a plurality of drain electrodes 175. The lower conductive film is preferably made of Cr, Mo, or Mo alloy, and the upper conductive film is preferably made of Al containing metal or Ag containing metal. In FIGS. 21A and 21B, the lower and the upper films of the data lines 171 are indicated by reference numerals 171p and 171q, respectively, the lower and the upper films of the source electrodes 173 are indicated by reference numerals 173p and 173q, respectively, the lower and the upper films of the drain electrodes 175 are indicated by reference numerals 175p and 175q, respectively, and the lower and the upper films of the end portions 179 of the data lines 171 are indicated by reference numerals 179p and 179q, respectively.

Thereafter, portions of the extrinsic semiconductor stripes, which are not covered with the data lines 171 and the drain electrodes 175, are removed to complete a plurality of ohmic contact stripes 161 including projections 163 and a plurality of ohmic contact islands 165 and to expose portions of the intrinsic semiconductor stripes 151. Oxygen plasma treatment preferably follows in order to stabilize the exposed surfaces of the semiconductor stripes 151.

Referring to FIGS. 16, 22A and 22B, a passivation layer 180 made of a photosensitive organic insulator is coated and exposed through a photo-mask 800 having a plurality of opaque areas 803, a plurality of transmissive areas 802, and a plurality of slit areas 801 disposed around the transmissive areas 802. Accordingly, portions of the passivation layer 180 facing the transmissive areas 802 absorb the full energy of the light, while portions of the passivation layer 180 facing the slit areas 801 partially absorb the light energy. The passivation layer 180 is then developed to form a plurality of contact holes 182 and 185 exposing portions of the end portions 179 of the data lines 171 and portions of the drain electrodes 175, respectively, and to form upper portions of a plurality of contact holes 181 exposing portions of the gate insulating layer 140 disposed on the end portions 129 of the gate lines 121. Since the portions of the passivation layer 180 facing the transmissive areas 802 are removed to its full thickness, while the portions facing the slit areas 801 remain to have reduced thickness, sidewalls of the contact holes 181, 182 and 185 have stepped profiles. The hatched portions of the passivation layer 180 in FIGS. 22A and 22B are portions to be removed and the transmissive areas 802 and the opaque areas 801 may be interchanged when the passivation layer 180 is a negative photoresist.

After removing the exposed portions of the gate insulating layer 140 to expose the underlying portions of the end portions 129 of the gate lines 121, the exposed portions of the upper conductive films 175q, 179q and 129q of the drain electrodes 175, the end portions 179 of the data lines 171, and the end portions 129 of the gate lines 121 are removed to expose underlying portions of the lower conductive films 175p, 179p and 129p of the drain electrodes 175, the end portions 179 of the data lines 171, and the end portions 129 of the gate lines 121.

Next, a plurality of pixel electrodes 190 and a plurality of contact assistants 81 and 82 are formed on the passivation layer 180 and on the exposed portions of the lower conductive films 175p, 129p and 179p of the drain electrodes 175, the end portions 129 of the gate lines 121, and the end portions 179 of the data lines 171 by sputtering and photo-etching an IZO or ITO layer with thickness of about 400-500 Å as shown in FIGS. 16 and 18-20.

Finally, a positive photosensitive organic insulating layer is coated on the common electrode 270, subjected to light exposure through a mask (not shown) having light transmitting areas and translucent areas, and developed to form a plurality of slope members 341. At this time, the mask may have light blocking areas facing opaque members such as TFTs, the gate lines 121, or the data lines 171 such that a plurality of columnar spacers (shown in FIG. 4) are formed on the opaque members.

An LCD according to another embodiment of the present invention will be described in detail with reference to FIGS. 23-25.

Figure 23:
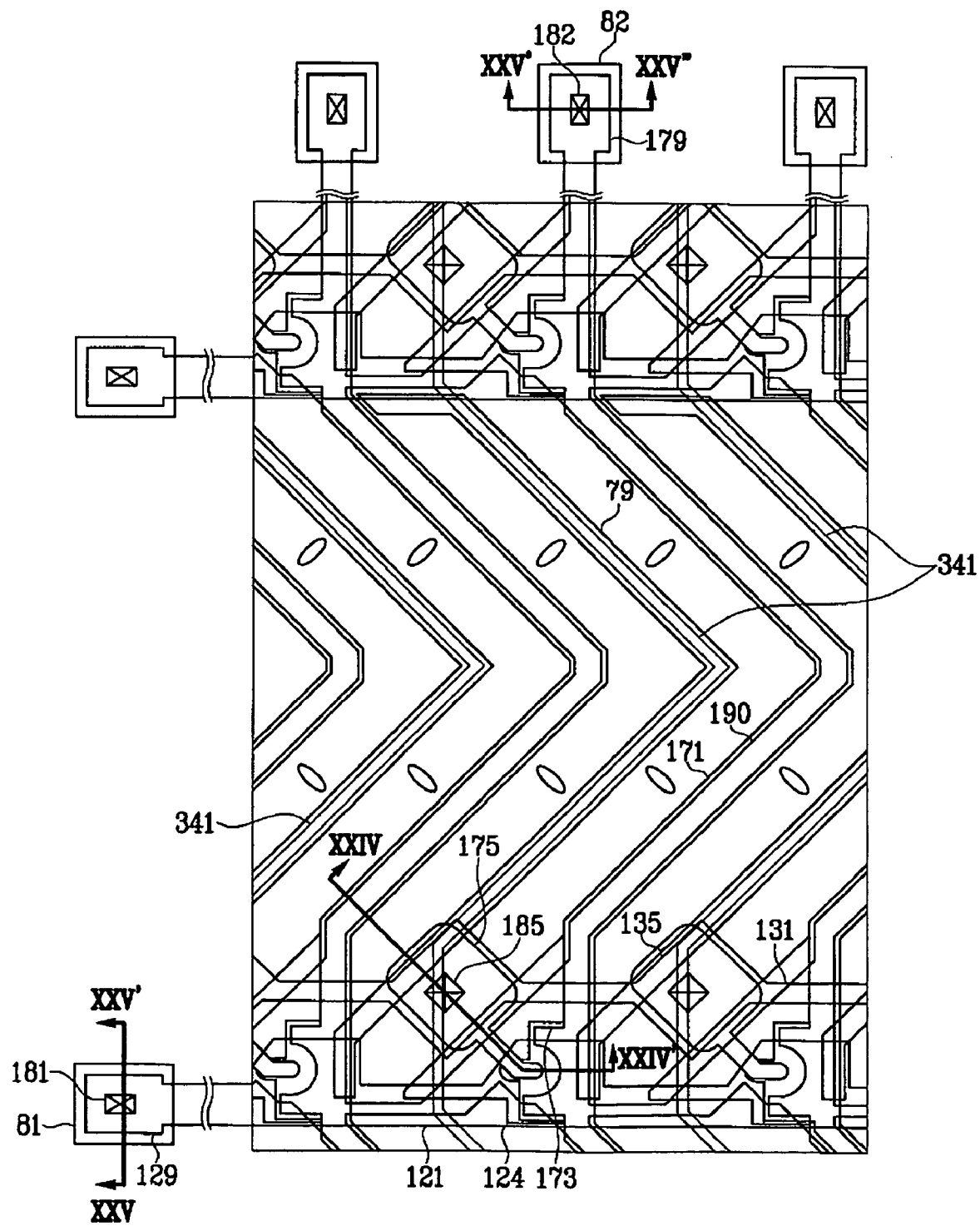
FIG. 23 is a layout view of an LCD according to another embodiment of the present invention.
Figure 24:
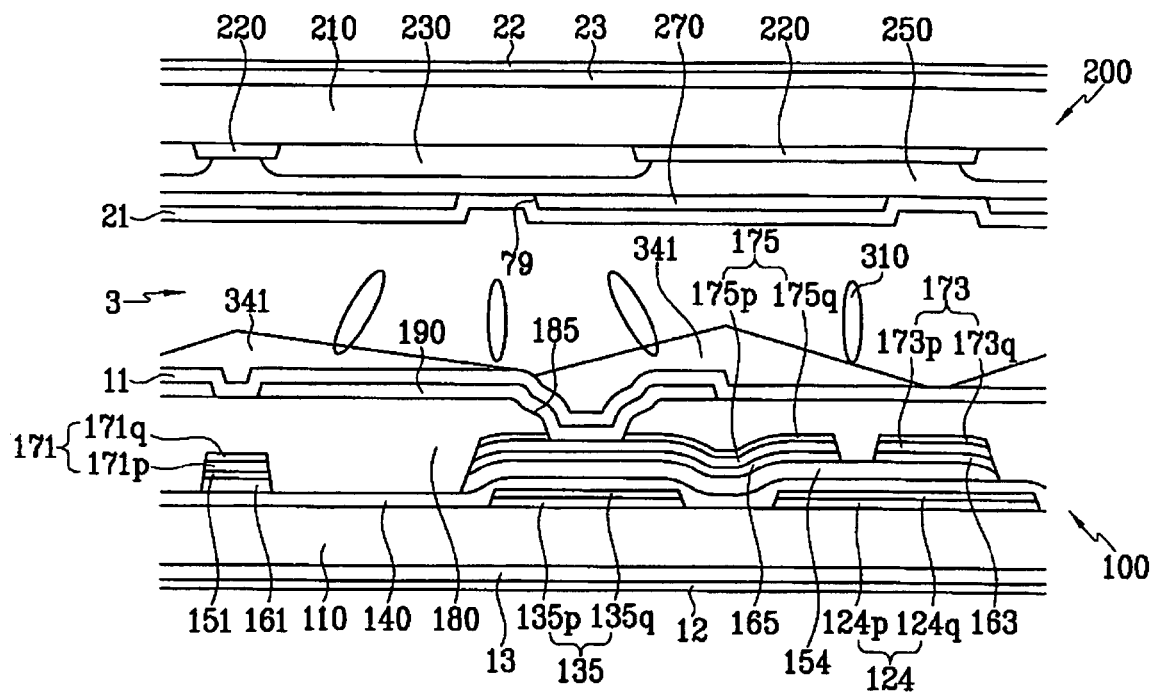
FIGS. 24 and 25 are sectional views of the LCD shown in FIG. 23 taken along the lines XXIV-XXIV' and XXV-XXV', respectively.
Figure 25:
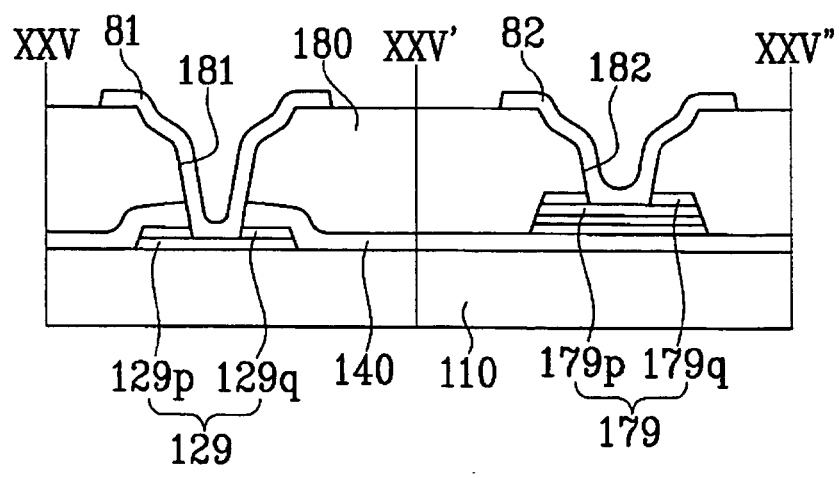

FIG. 23 is a layout view of an LCD according to another embodiment of the present invention, and FIGS. 24 and 25 are sectional views of the LCD shown in FIG. 23 taken along the lines XXIV-XXIV' and XXV-XXV', respectively.

Referring to FIGS. 23-25, an LCD according to this embodiment also includes a TFT array panel 100, a common electrode panel 200, a LC layer 3 and a plurality of columnar spacers 320 interposed between the panels 100 and 200, and a pair of polarizers 12 and 22 and a pair of retardation films 13 and 23 attached on outer surfaces of the panels 100 and 200.

Layered structures of the panels 100 and 200 according to this embodiment are almost the same as those shown in FIGS. 16-20.

Regarding the TFT array panel 100, a plurality of gate lines 121 including gate electrodes 124 and end portions 129 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179 and a plurality of drain electrodes 175 are formed on the ohmic contacts 161 and 165, and a passivation layer 180 is formed thereon. A plurality of contact holes 181, 182 and 185 are provided at the passivation layer 180 and the gate insulating layer 140 and a plurality of pixel electrodes 190 and a plurality of contact assistants 81 and 82 are formed on the passivation layer 180.

A plurality of slope members 341 are formed on the pixel electrodes 190 and the passivation layer 180 and an alignment layer 11 is coated thereon.

Regarding the common electrode panel 200, a light blocking member 220, a plurality of color filters 230, an overcoat 250, a common electrode 270 having a plurality of cutouts 79, and an alignment layer 21 are formed on an insulating substrate 210.

Different from the LCD shown in FIGS. 16-20, the semiconductor stripes 151 of the TFT array panel 100 according to this embodiment have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Many of the above-described features of the LCD shown in FIGS. 16-20 may be appropriate to the TFT array panel shown in FIGS. 23-25.

An LCD according to another embodiment of the present invention will be described in detail with reference to FIGS. 26-29.

Figure 26:
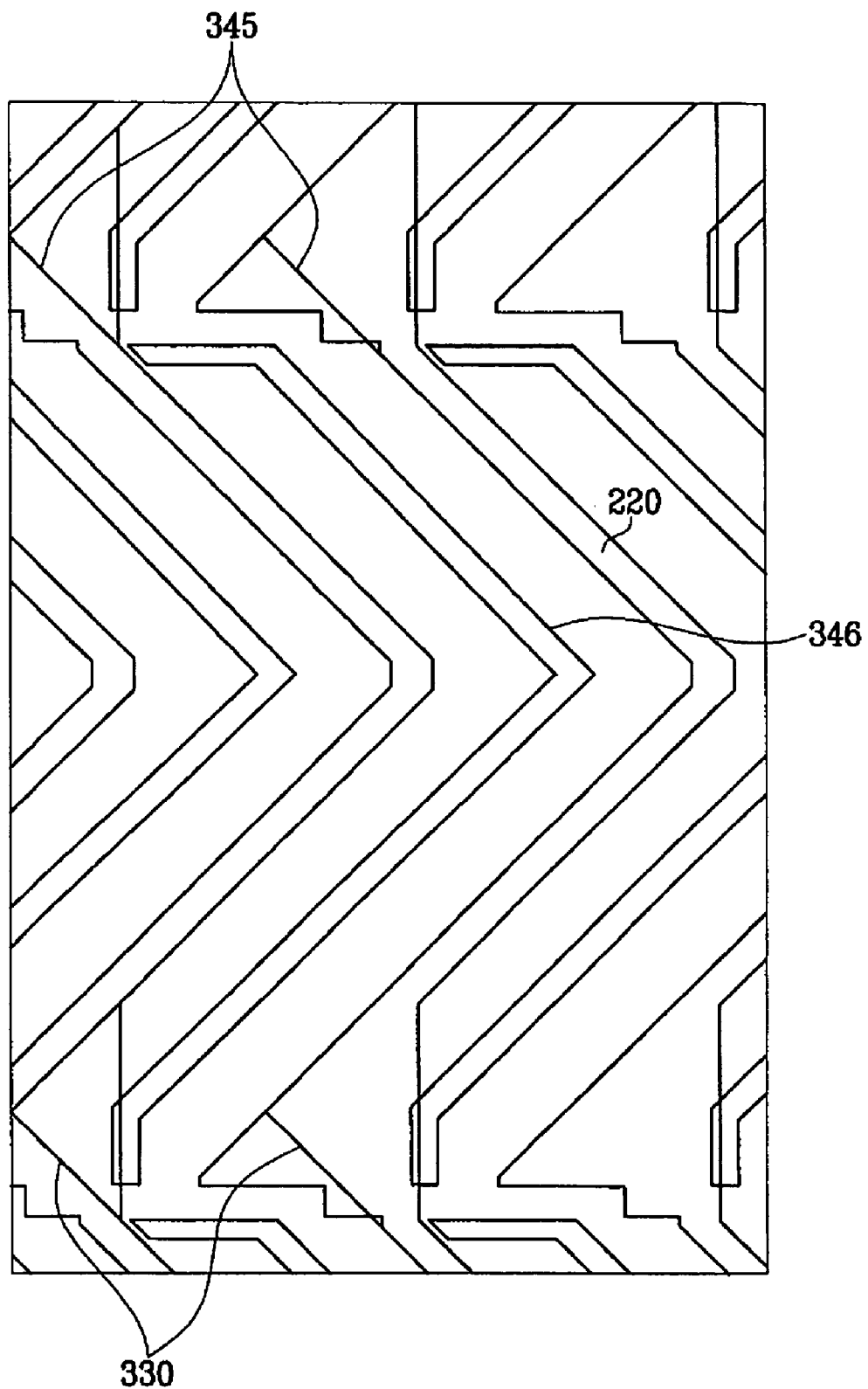
FIG. 26 is a layout view of a common electrode panel for an LCD according to another embodiment of the present invention.
Figure 27:
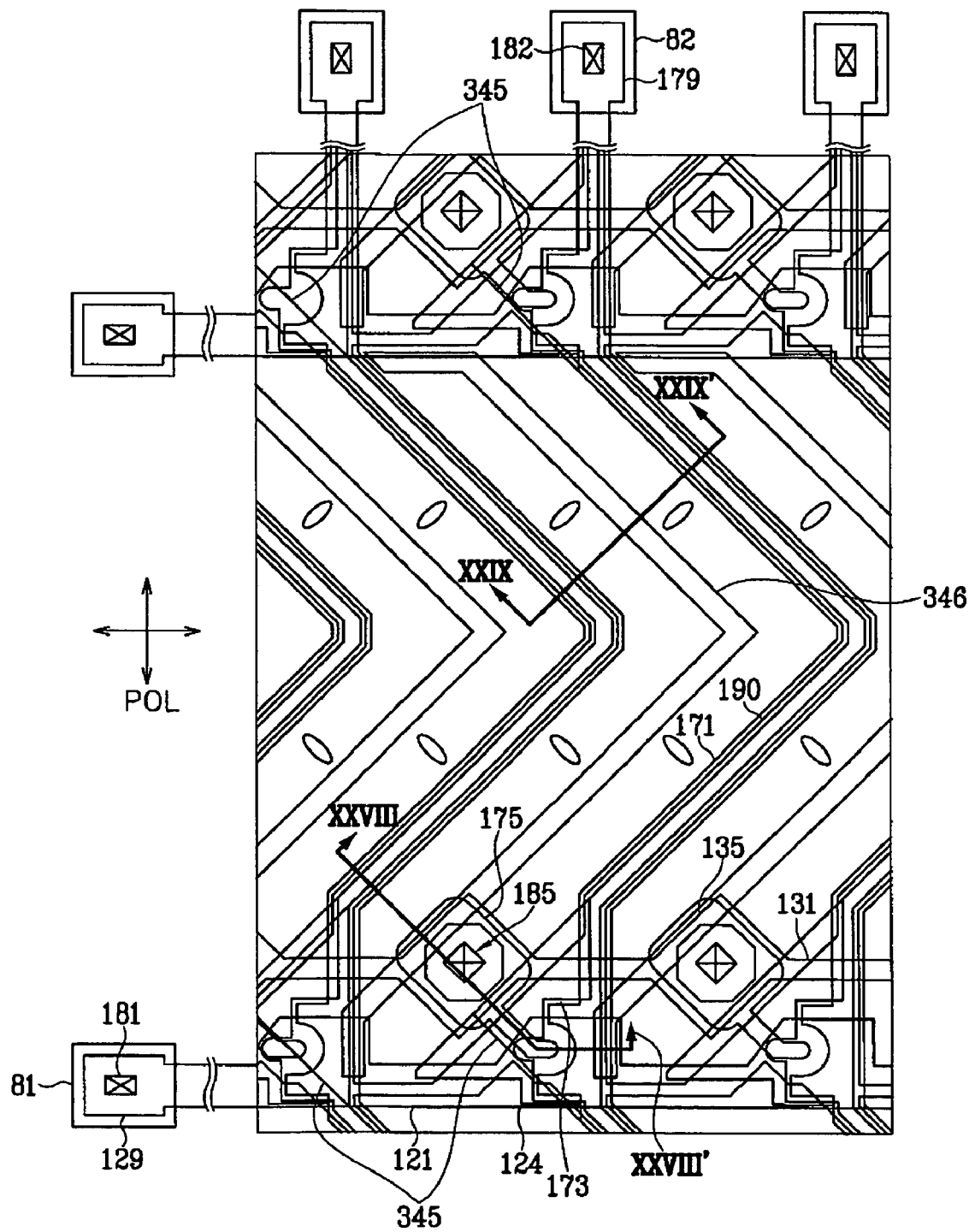
FIG. 27 is a layout view of an LCD including the TFT array panel shown in FIG. 16 and the common electrode panel shown in FIG. 26.
Figure 28:
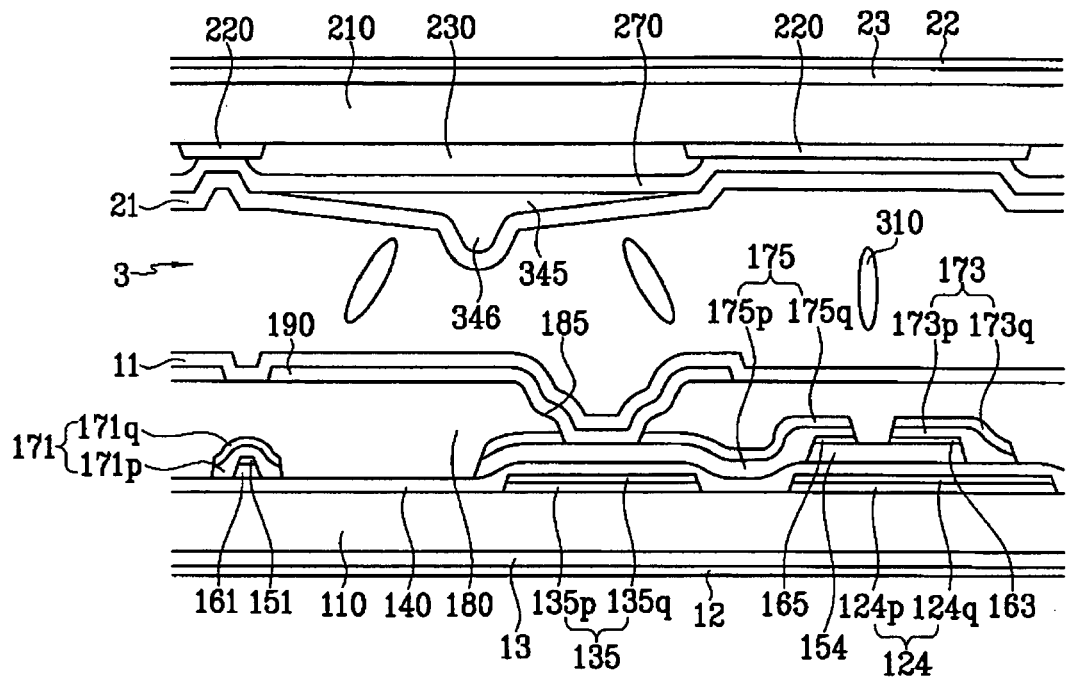
FIGS. 28 and 29 are sectional views of the LCD shown in FIG. 27 taken along the lines XXIV-XXIV' and XXV-XXV', respectively.
Figure 29:
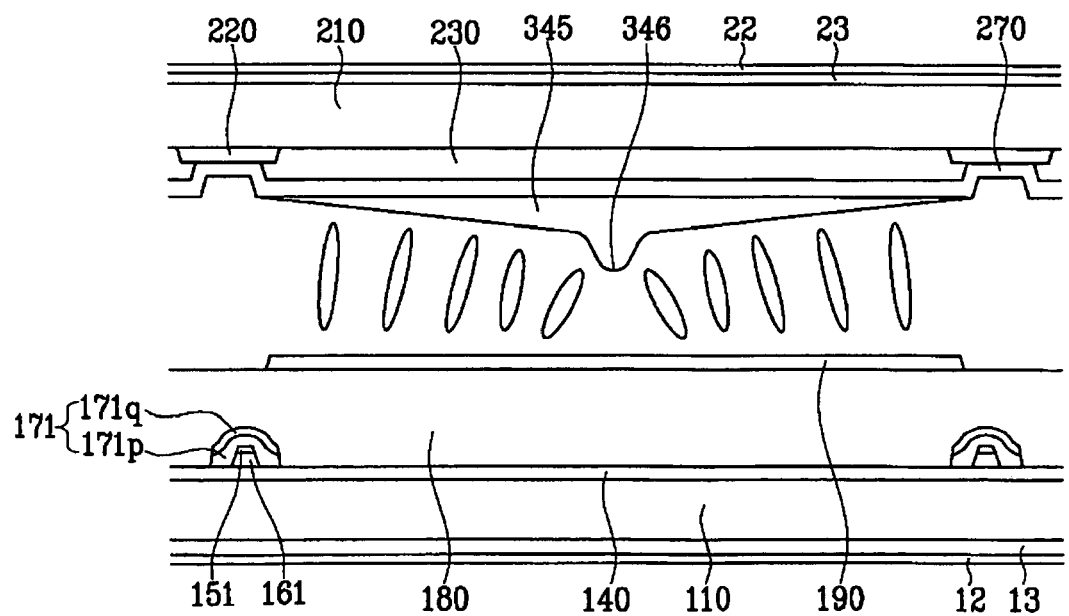

FIG. 26 is a layout view of a common electrode panel for an LCD according to another embodiment of the present invention, FIG. 27 is a layout view of an LCD including the TFT array panel shown in FIG. 16 and the common electrode panel shown in FIG. 26, and FIGS. 28 and 29 are sectional views of the LCD shown in FIG. 27 taken along the lines XXIV-XXIV' and XXV-XXV', respectively.

Referring to FIGS. 26-29, an LCD according to this embodiment also includes a TFT array panel 100, a common electrode panel 200, a LC layer 3 and a plurality of columnar spacers 320 interposed between the panels 100 and 200, and a pair of polarizers 12 and 22 and a pair of retardation films 13 and 23 attached on outer surfaces of the panels 100 and 200.

Layered structures of the panels 100 and 200 according to this embodiment are almost the same as those shown in FIGS. 16-20.

Regarding the TFT array panel 100, a plurality of gate lines 121 including gate electrodes 124 and end portions 129 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179 and a plurality of drain electrodes 175 are formed on the ohmic contacts 161 and 165, and a passivation layer 180 is formed thereon. A plurality of contact holes 181, 182 and 185 are provided at the passivation layer 180 and the gate insulating layer 140. A plurality of pixel electrodes 190 and a plurality of contact assistants 81 and 82 are formed on the passivation layer 180, and an alignment layer 11 is coated thereon.

Regarding the common electrode panel 200, a light blocking member 220, a plurality of color filters 230, a common electrode 270, and an alignment layer 21 are formed on an insulating substrate 210.

Different from the LCD shown in FIGS. 16-20, the common electrode panel 200 includes a plurality of slope members 345 disposed on the common electrode 270, while the TFT array panel 100 has no slope member and the common electrode panel 200 has no cutout. Like the slope members 341, the slope members 345 are preferably made of insulator. Each of the slope members 341 has principal edges extending parallel to the data lines 171 and disposed on the data lines 171 and secondary edges parallel to the gate lines 121 such that it has a planar shape of chevron. Each of the slope members 341 has a protruding ridge 346, which is disposed approximately on an imaginary center line bisecting a pixel electrode 190 into left and right halves and extends thereal ong, and inclined surfaces that have heights decreasing from the ridge 346 to the principal edges. It is noted that most portions of principal edges of the slope members 345 coincide with the light blocking members 220 in the figures.

The protruding ridges 346 are substituted for the cutouts 79 shown in FIGS. 17-19 and serve as tilt direction determining members for determining the tilt directions of the LC molecules 310. The ridges 346 preferably have width of about 5-10 microns. The inclination angle θ of the inclined surfaces relative to the surface of the substrate 210 is in a range of about 0.5-20 degrees and the cell gap between the panels 100 and 200, i.e., the thickness of the LC layer 3 varies from about 0.5 microns to about 2.0 microns.

In addition, the common electrode 270 has no overcoat.

Many of the above-described features of the LCD shown in FIGS. 16-20 may be appropriate to the TFT array panel shown in FIGS. 26-29.

A method of manufacturing the common electrode panel shown in FIGS. 26-29 is described in detail with reference to FIG. 30.

Figure 30:
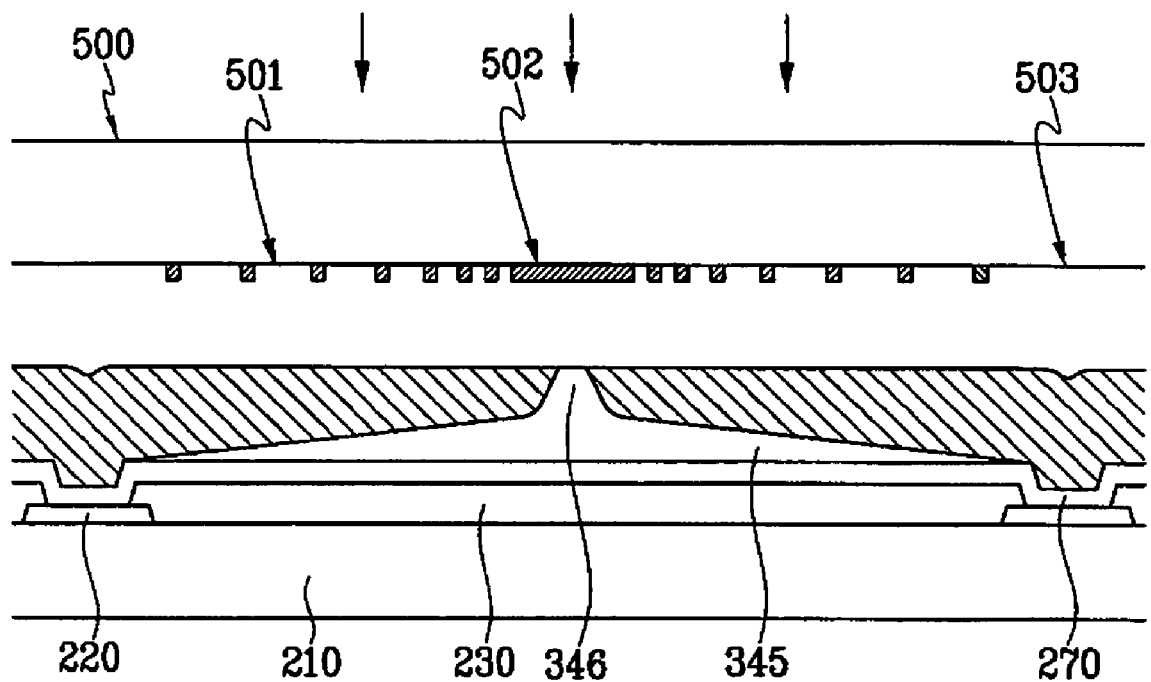
FIG. 30 is a sectional view of a common electrode panel shown in FIGS. 26-29 and a mask for forming slope members in an intermediate step of a manufacturing method thereof according to an embodiment of the present invention.

FIG. 30 is a sectional view of a common electrode panel shown in FIGS. 26-29 and a mask for forming slope members in an intermediate step of a manufacturing method thereof according to an embodiment of the present invention.

Referring to FIG. 30, a light blocking member 220 preferably made of a Cr film and a Cr oxide film, a plurality of color filters 230, and a common electrode 270 are formed in sequence on an insulating substrate 210.

Next, a thick photosensitive organic insulating layer is coated on the common electrode 270, subjected to light exposure through a mask 500, and developed to form a plurality of slope members 345 including protruding ridge lines 346. The mask 500 includes light blocking areas 502 facing the ridge lines 346 of the slope members 345, light transmitting areas 503, and translucent areas 501 having a plurality of slits. The width of the slits increases from the light blocking areas 502 to the light transmitting areas 503. However, the distance between the slits may decrease from the light blocking areas 502 to the light transmitting areas 503.

An LCD according to another embodiment of the present invention will be described in detail with reference to FIGS. 31-34.

Figure 31:
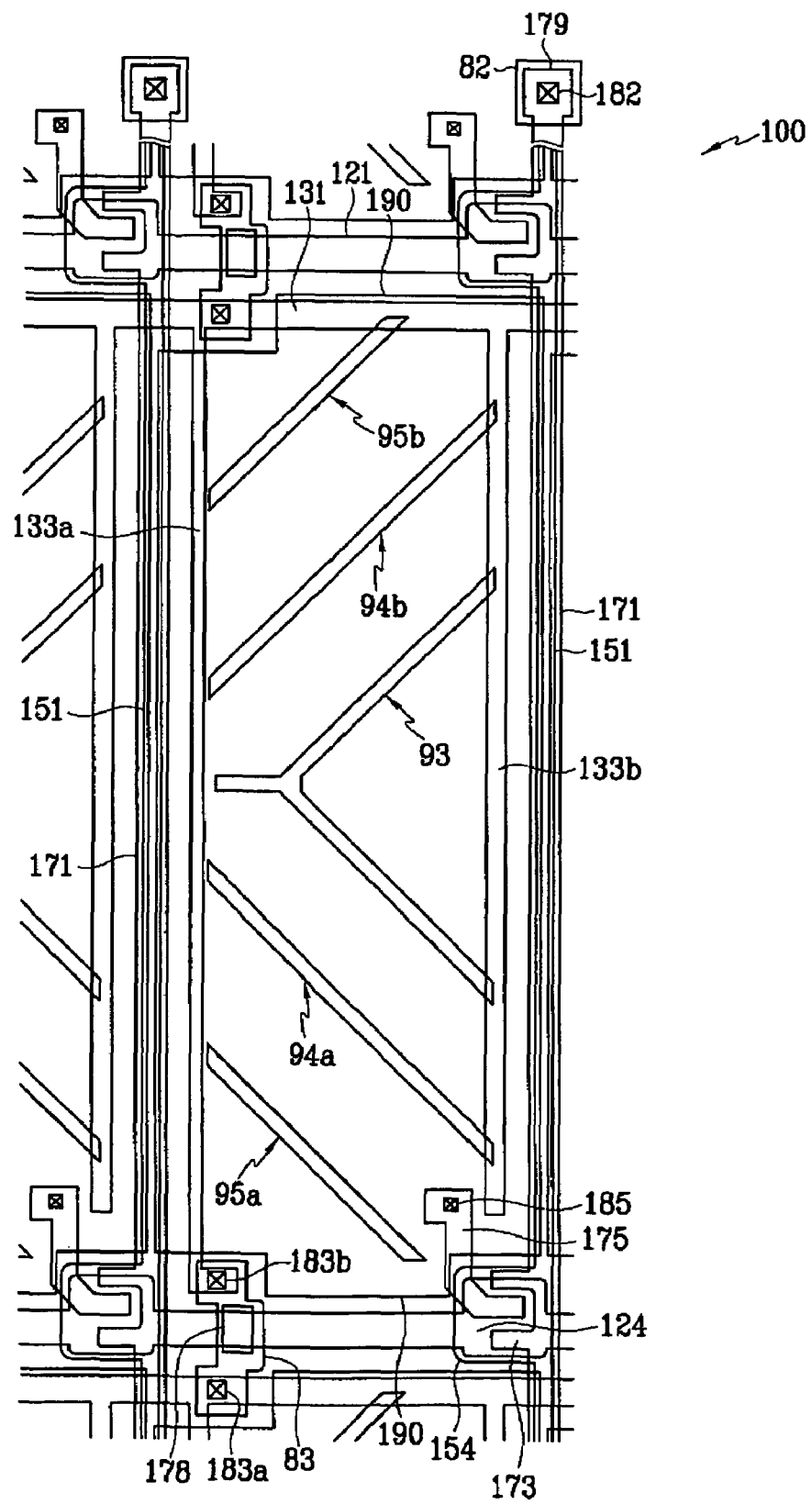
FIG. 31 is a layout view of a TFT array panel of an LCD according to another embodiment of the present invention.
Figure 32:
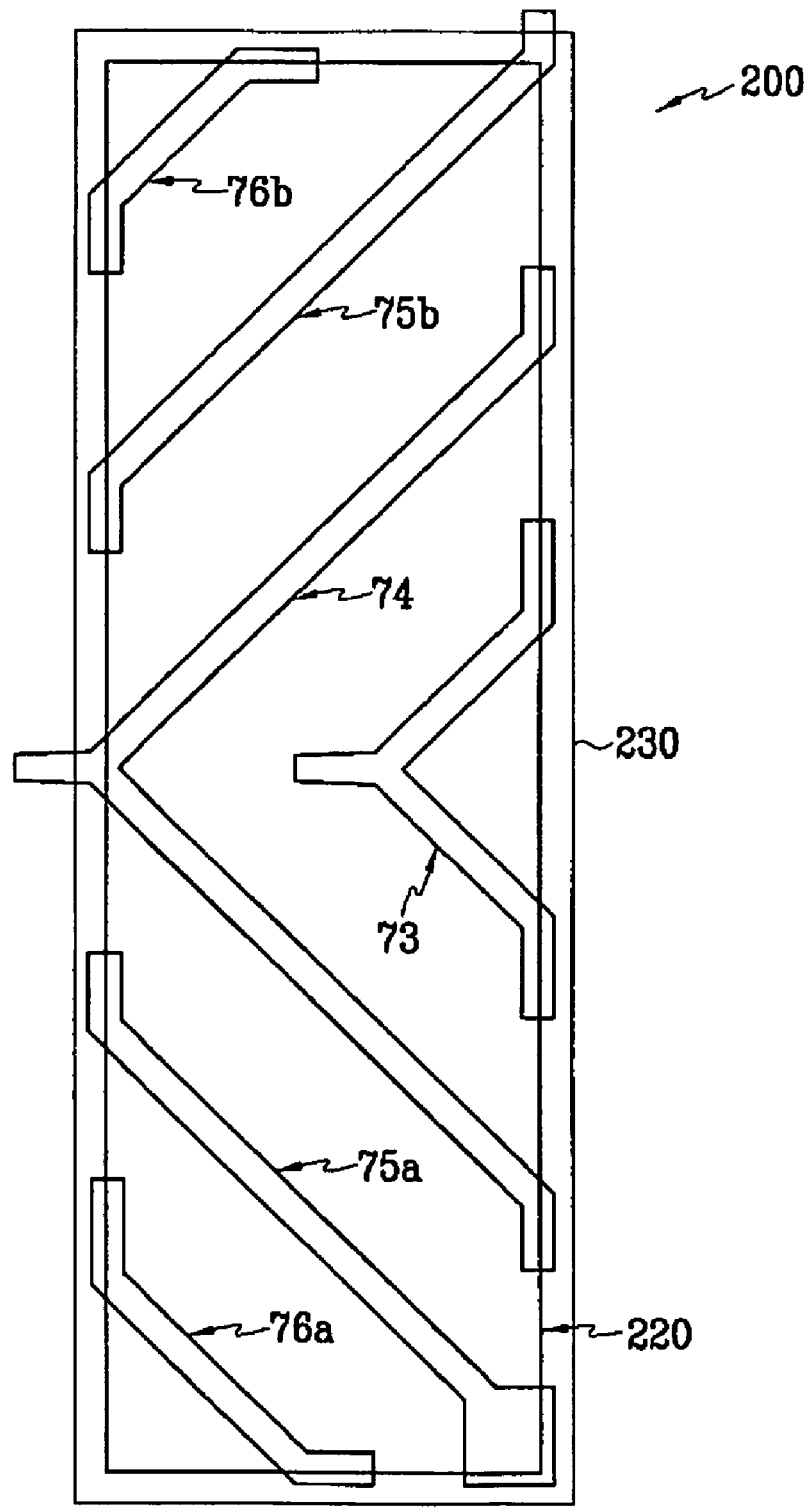
FIG. 32 is a layout view of a common electrode panel of an LCD according to an embodiment of the present invention.
Figure 33:
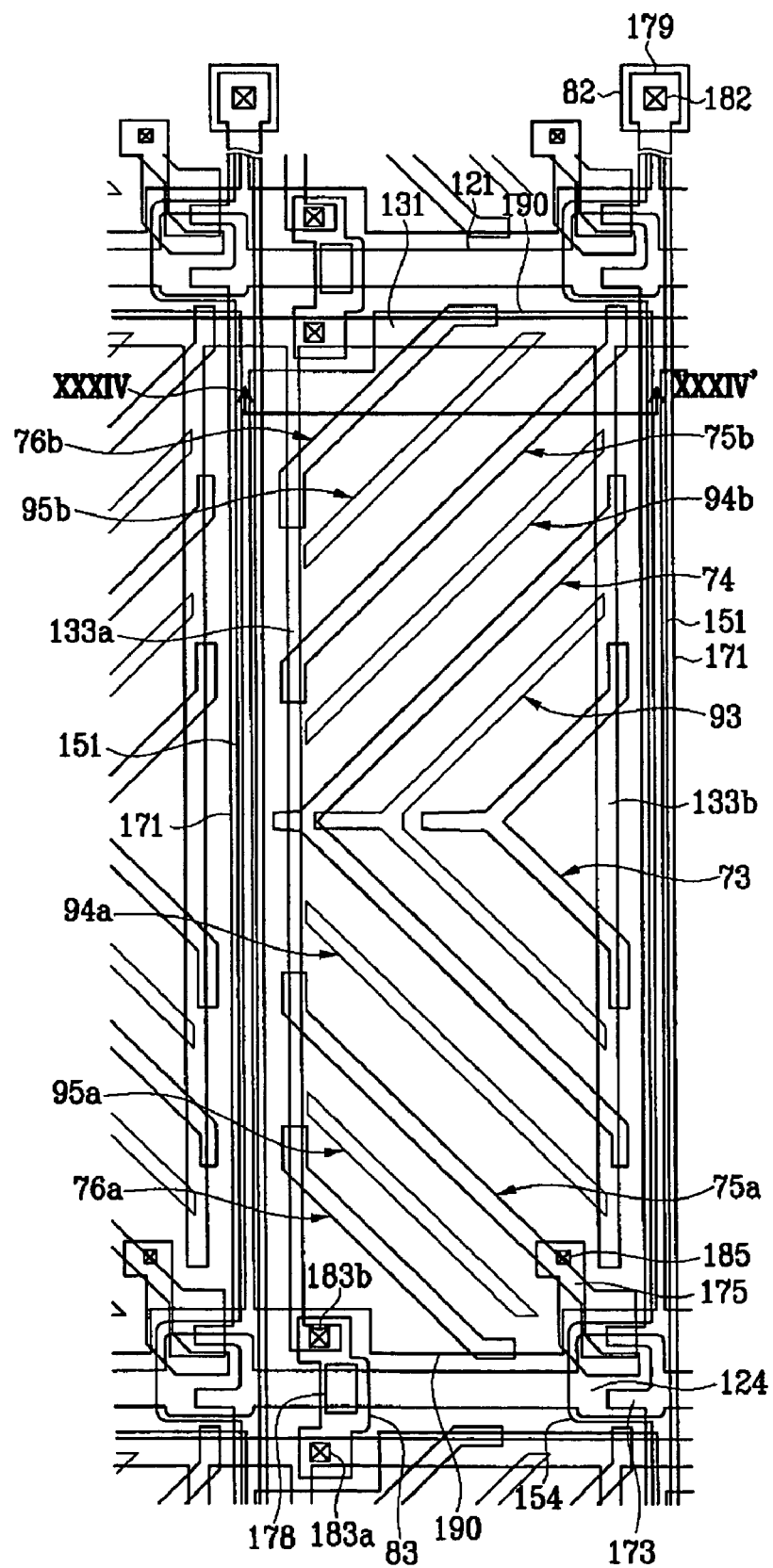
FIG. 33 is a layout view of an LCD including the TFT array panel shown in FIG. 31 and the common electrode panel shown in FIG. 32.
Figure 34:
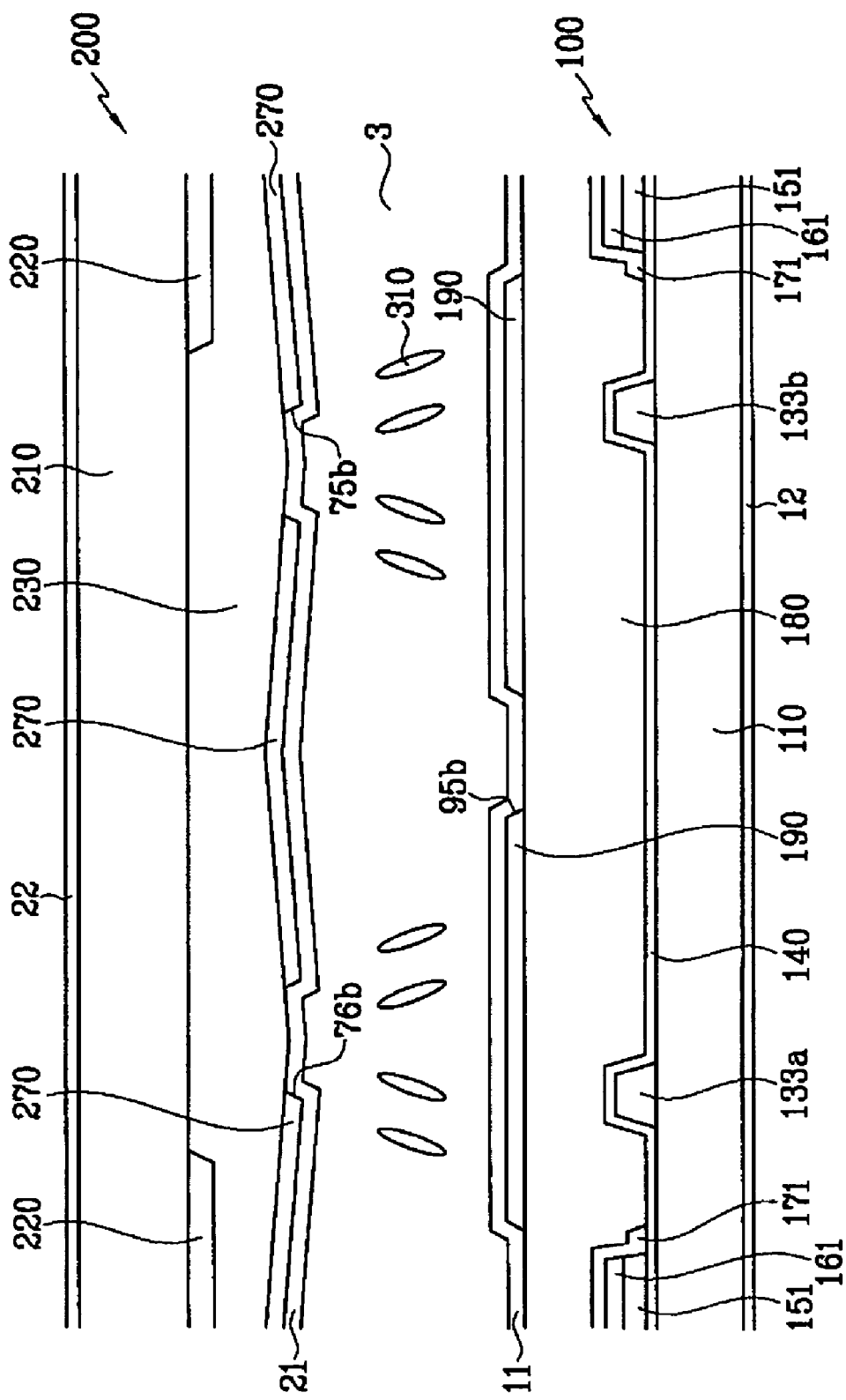
FIG. 34 is a sectional view of the LCD shown in FIG. 33 taken along the line XXXIV-XXXIV'.

FIG. 31 is a layout view of a TFT array panel of an LCD according to another embodiment of the present invention, FIG. 32 is a layout view of a common electrode panel of an LCD according to an embodiment of the present invention, FIG. 33 is a layout view of an LCD including the TFT array panel shown in FIG. 31 and the common electrode panel shown in FIG. 32, and FIG. 34 is a sectional view of the LCD shown in FIG. 33 taken along the line XXXIV-XXXIV'.

Referring to FIGS. 31-34, an LCD according to this embodiment also includes a TFT array panel 100, a common electrode panel 200, a LC layer 3 and a plurality of columnar spacers 320 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-4.

Regarding the TFT array panel 100, a plurality of gate lines 121 including gate electrodes 124 and end portions 129 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 178 are formed on the ohmic contacts 161 and 165, and a passivation layer 180 is formed thereon. A plurality of contact holes 181, 182, 183a, 183b and 185 are provided at the passivation layer 180 and the gate insulating layer 140. A plurality of pixel electrodes 190, a plurality of contact assistants 81 and 82, and a plurality of overpasses 83 are formed on the passivation layer 180, and an alignment layer 11 is coated thereon.

Regarding the common electrode panel 200, a light blocking member 220, a plurality of color filters 230, a common electrode 270, and an alignment layer 21 are formed on an insulating substrate 210.

Different from the LCD shown in FIGS. 1-4, the color filters 230 of the common electrode panel 200 has a periodically inclined surface, while the TFT array panel 100 has no slope member.

In addition, each pixel electrode 190 of the TFT array panel 100 shown in FIGS. 31, 33 and 34 has a plurality of cutouts 93-95b including a center cutout 93, a pair of lower cutouts 94a and 95a, and a pair of upper cutouts 94b and 95b, which partition the pixel electrode 190 into a plurality of partitions. The lower and the upper cutouts 94a-95b are disposed at lower and upper halves of the pixel electrode 190, respectively, and the center cutout 93 is located between the lower cutouts 94a and 95a and the upper cutouts 94b and 95b. The cutouts 93-95b substantially have inversion symmetry with respect to an imaginary transverse line that bisects the pixel electrode 190 into lower and upper halves.

The lower and the upper cutouts 94a-95b make an angle of about 45 degrees to the gate lines 121, and the upper cutouts 94b and 95b, which extend substantially parallel to each other, extend substantially perpendicular to the lower cutouts 94a and 95a, which extend substantially parallel to each other.

The cutouts 95a and 95b extend approximately from a left longitudinal edge of the pixel electrode 190 approximately to transverse edges of the pixel electrode 190. The cutouts 94a and 94b extend approximately from the left edge of the pixel electrode 190 approximately to a right longitudinal edge of the pixel electrode 190.

The center cutout 93 includes a transverse portion extending approximately from the left edge of the pixel electrode 190 along the imaginary transverse line and a pair of oblique portions extending from the transverse portion to the right edge of the pixel electrode 190 and extending substantially parallel to the lower cutouts 94a and 95a and the upper cutouts 94b and 95b, respectively.

Accordingly, the lower half of the pixel electrode 190 is partitioned into four lower partitions by the lower cutouts 94a and 95a and the center cutout 93, and the upper half of the pixel electrode 190 is also partitioned into four upper partitions by the upper cutouts 94b and 95b and the center cutout 93. The number of partitions or the number of cutouts is varied depending on the design factors such as the size of pixels, the ratio of the transverse edges and the longitudinal edges of the pixel electrodes 190, the type and characteristics of the LC layer 3, and so on.

The common electrode 270 has a plurality of sets of cutouts 73-75b.

A set of cutouts 73-75b face a pixel electrode 190 and include a pair of center cutouts 73 and 74 and pairs of lower and upper cutouts 75a and 76a and 75b and 76b and. Each of the cutouts 73-75b is disposed between adjacent cutouts 93-95b of the pixel electrode 190 or between a cutout 95a or 95b and a corner of the pixel electrode 190. In addition, each of the cutouts 73-75b has at least an oblique portion extending parallel to the lower cutouts 94a and 95a or the upper cutouts 94b and 95b of the pixel electrode 190. The cutouts 73-75b have substantially inversion symmetry with respect to the imaginary transverse line.

Each of the cutouts 76a and 76b has an oblique portion extending approximately from a left edge of the pixel electrode 190 approximately to a lower or upper edge of the pixel electrode 190 and transverse and longitudinal portions extending from respective ends of the oblique portion along edges of the pixel electrode 190, overlapping the edges of the pixel electrode 190, and making obtuse angles with the oblique portion.

Each of the cutouts 75a and 75b has an oblique portion, a longitudinal portion connected to an end of the oblique portion, and an expansion connected to the other end of the oblique portion. The oblique portion extends approximately from the left edge of the pixel electrode 190 approximately to lower right or upper right corner of the pixel electrode 190. The longitudinal portion extends from the end of the oblique portion along the left edge of the pixel electrode 190, overlaps the left edge of the pixel electrode 190, and makes an obtuse angle with the oblique portion. The expansion covers the respective corner of the pixel electrode 190.

The cutout 74 has a pair of oblique portions extending approximately from the center of the left edge of the pixel electrode 190 to the right edge of the pixel electrode 190, a transverse portion extending from a meeting point of the oblique portions to the left, and a pair of longitudinal portions extending from the respective oblique portions along the right edge of the pixel electrode 190, overlapping the right edge of the pixel electrode 190, and making an obtuse angle with the respective oblique portions. The cutout 73 has a transverse portion extending along the transverse center line of the pixel electrode 190, a pair of oblique portions extending from the transverse portion approximately to the right edge of the pixel electrode 190 and making obtuse angles with the transverse portion, and a pair of longitudinal portions extending from the respective oblique portions along the right edge of the pixel electrode 190, overlapping the right edge of the pixel electrode 190, and making an obtuse angle with the respective oblique portions.

The number of the cutouts 73-75b may be varied depending on the design factors, and the light blocking member 220 may also overlap the cutouts 73-75b to block the light leakage through the cutouts 73-75b.

The inclined surface has an inclination angle preferably ranging about 1-5 degrees. The inclined surface has maximum heights at the cutouts 73-76b and minimum heights at places facing the cutouts 93-95b.

Since the distance between the common electrode 270 and the pixel electrodes 190 varies, the equipotential lines and the electric field therebetween also vary depending on the distance. The electric field becomes strong at places where the distance is small such that the LC molecules 310 exhibit fast response time.

Figure 37:
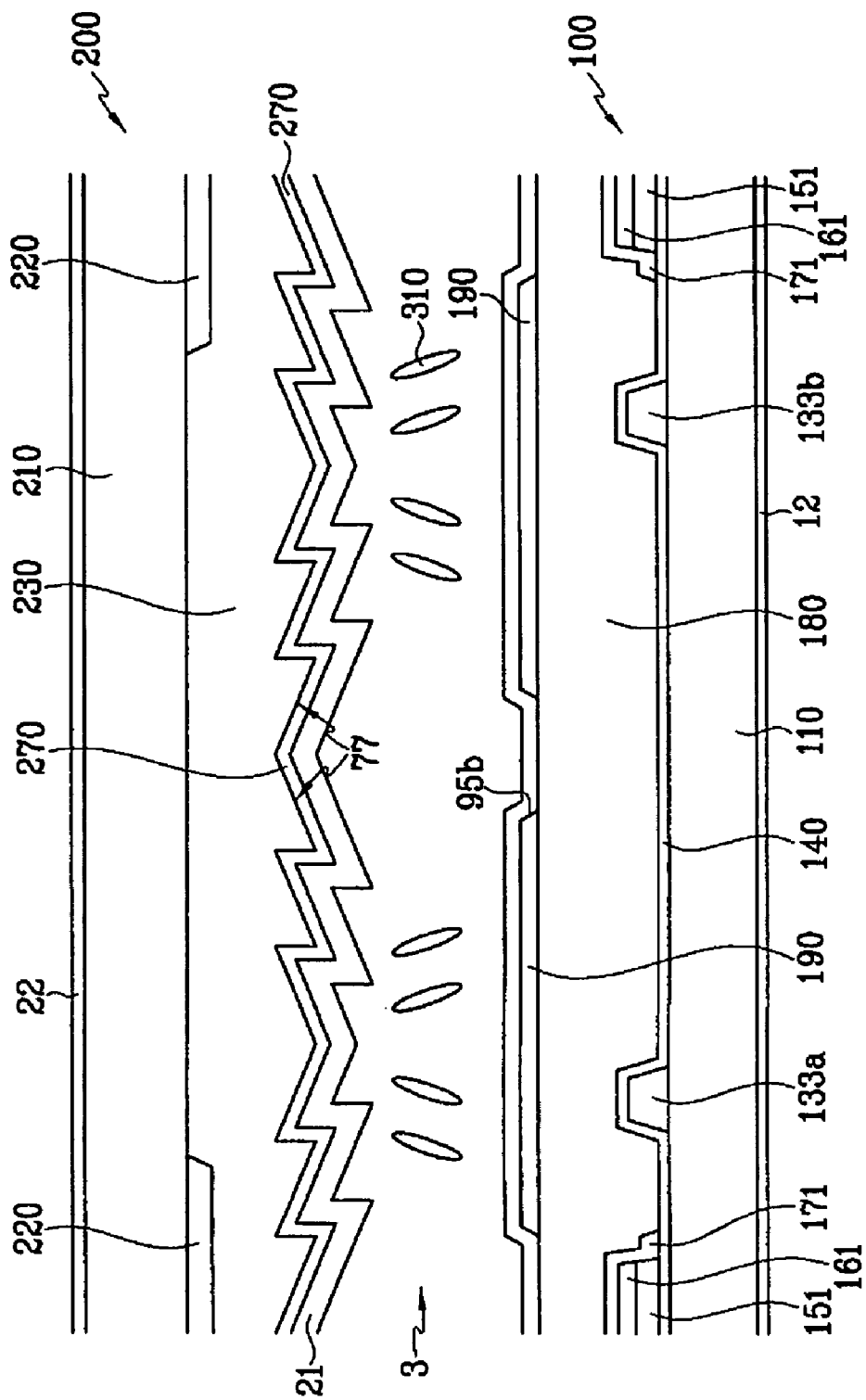
FIGS. 37 and 38 show other exemplary sectional views of the LCD shown in FIGS. 31-33.
Figure 38:
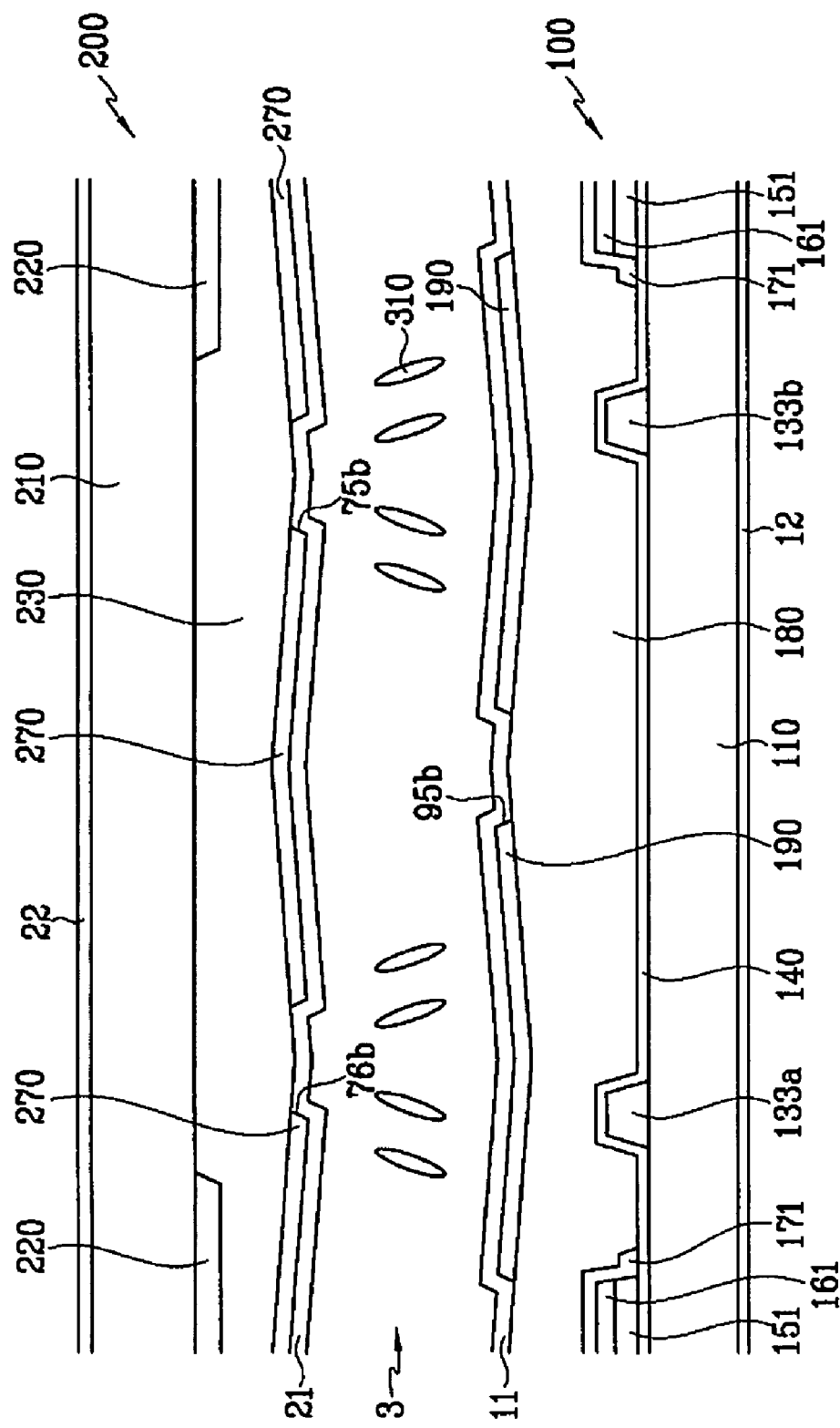

The sectional structure of the LCD shown in FIGS. 31-34 may be varied as shown in FIGS. 37 and 38, which show other exemplary sectional views of the LCD shown in FIGS. 31-33.

FIG. 37 shows that the surface of the color filters 230 is saw-toothed and thus the common electrode 270 and the alignment layer 21 are also saw-toothed. Each of the sawtooths 77 has an inclined surface having an inclination angle of about 1-5 degrees and a vertical surface. The direction of the inclination is periodically reversed to form a plurality of concavities and convexities and the concavities face the cutouts 93-95b.

The LCD may include an overcoat 250 having a saw-toothed surface, which are disposed between the color filters 230 having a flat surface and the common electrode 270.

FIG. 38 shows that the surface of the passivation layer 180 as well as the color filters 230 is periodically inclined such that their concavities and their concavities are alternately arranged.

A manufacturing method of the TFT array panel shown in FIGS. 31-34 according to an embodiment will be described in detail with reference to FIGS. 35A-35C.

Figure 35A:
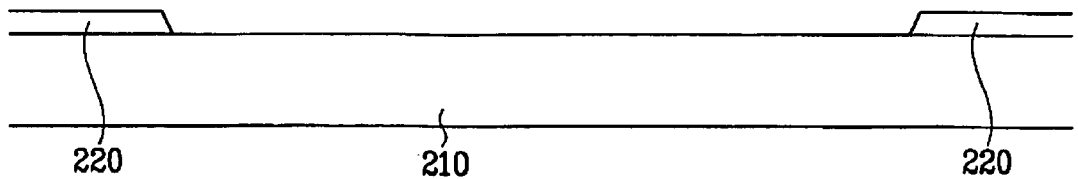
FIGS. 35A-35C are sectional views of the common electrode panel shown in FIGS. 31-34 in intermediate steps of a manufacturing method thereof according to an embodiment of the present invention.
Figure 35B:
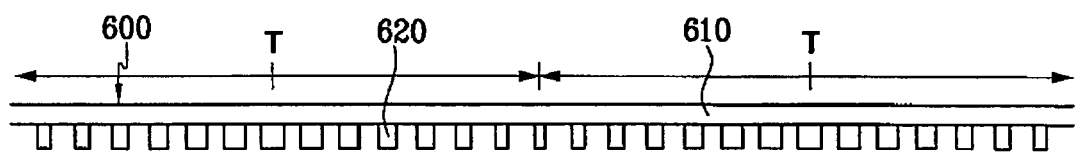
Figure 35B:
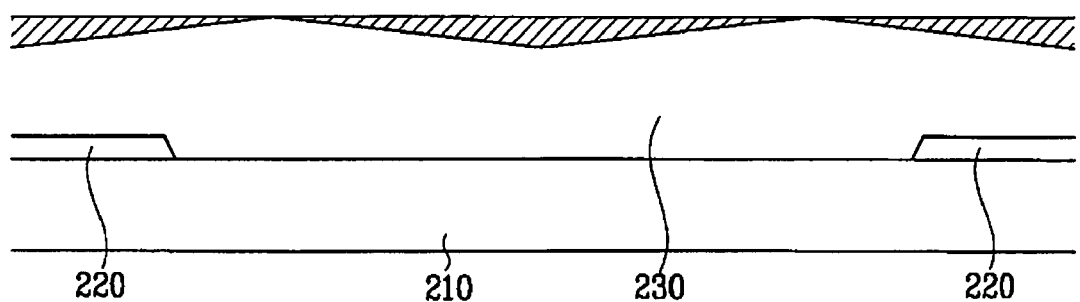
Figure 35C:
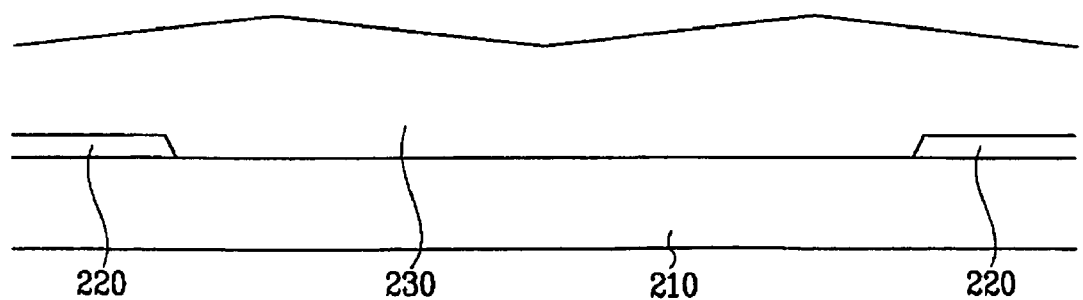

FIGS. 35A-35C are sectional views of the common electrode panel shown in FIGS. 31-34 in intermediate steps of a manufacturing method thereof according to an embodiment of the present invention.

Referring to FIG. 35A, a light blocking member 220 preferably made of photosensitive organic insulator containing black pigment is formed on an insulating substrate 210.

Referring to FIG. 35B, a photosensitive organic film containing red, green, or blue pigment is coated and a mask 600 is aligned with the substrate 210. The mask 600 includes a transparent substrate 610 and light blocking members 620 spaced apart from each other by predetermined distances to form slits. The width of the light blocking members 620 decreases far from reference points T, or the distance between the light blocking members 620 increases far from the reference points T. The hatched portions shown in FIG. 35B indicate those to be removed.

The photosensitive film is then exposed to light through the mask 600 and developed to form a plurality of color filters 230 as shown in FIG. 35C.

Referring to FIG. 34, a common electrode 270 having a plurality of cutouts 73-76b is formed on the color filters 230. The common electrode 270 may have no cutout.

Many of the above-described features of the LCD shown in FIGS. 1-4 may be appropriate to the TFT array panel shown in FIGS. 31-35C.

A manufacturing method of a TFT array panel according to an embodiment will be described in detail with reference to FIGS. 36A-36D.

FIGS. 36A-36D are sectional views of a common electrode panel in intermediate steps of a manufacturing method thereof according to an embodiment of the present invention.

Figure 36A:
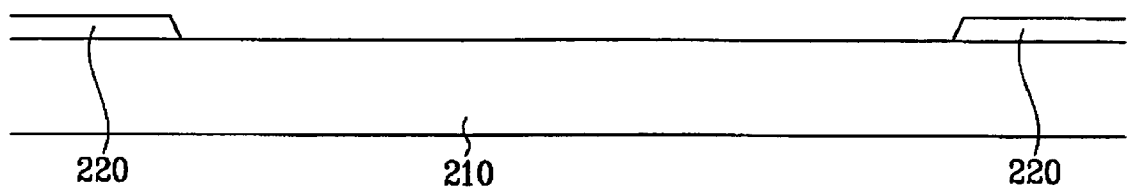
FIGS. 36A-36D are sectional views of a common electrode panel in intermediate steps of a manufacturing method thereof according to an embodiment of the present invention.

Referring to FIG. 36A, a light blocking member 220 preferably made of photosensitive organic insulator containing black pigment is formed on an insulating substrate 210.

Figure 36B:
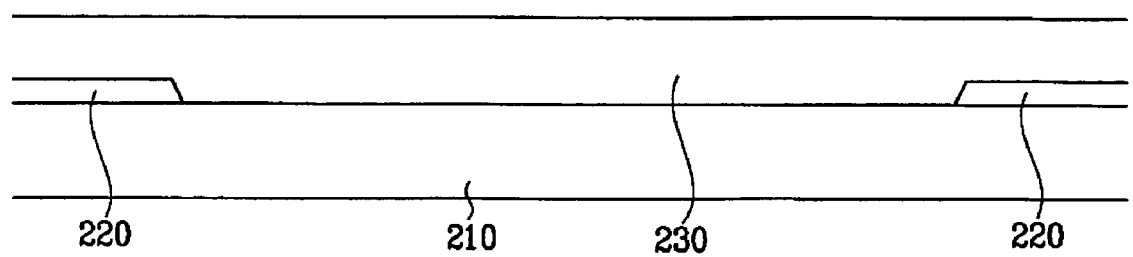

Referring to FIG. 36B, a plurality of color filters 230 are formed on the substrate 110 and the light blocking member 220.

Figure 36C:
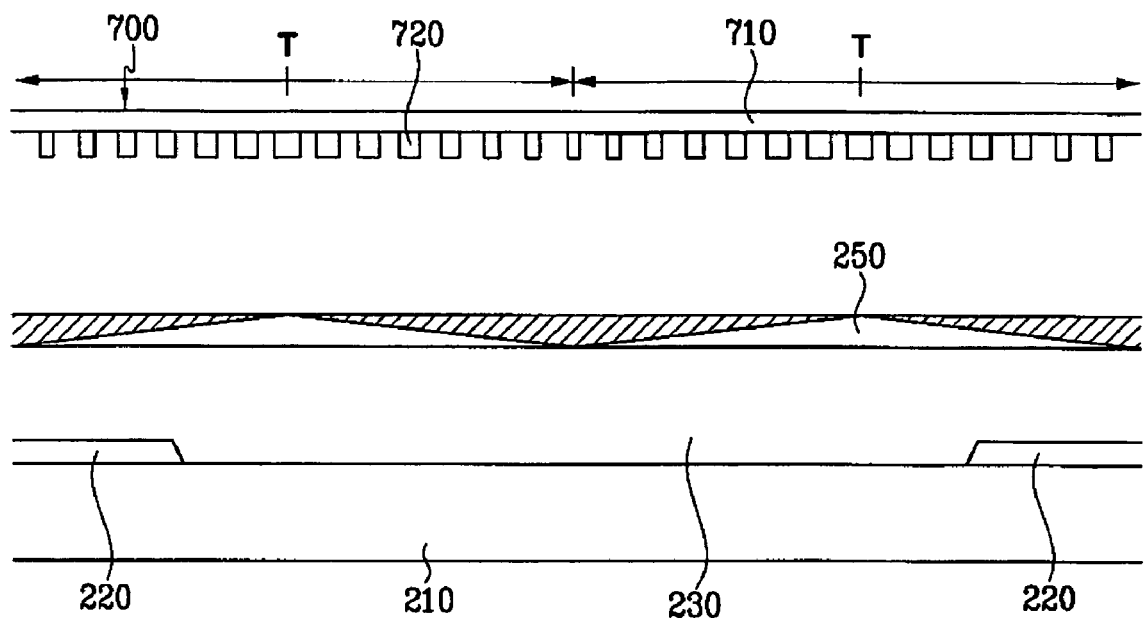

Referring to FIG. 36C, a photosensitive organic film is coated and a mask 700 including a transparent substrate 710 and light blocking members 720 is aligned with the substrate 210 like that shown in FIG. 35B. The hatched portions shown in FIG. 36C indicate those to be removed.

Figure 36D:
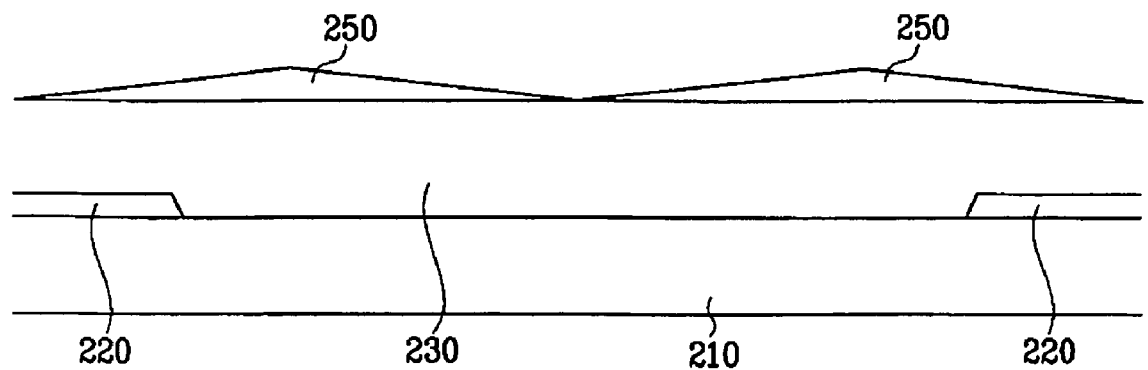

The photosensitive film is then exposed to light through the mask 700 and developed to form an overcoat 250 having a periodically inclined surface as shown in FIG. 36D.

Finally, a common electrode (not shown) is formed on the overcoat 250.

Many of the above-described features of the LCD shown in FIGS. 1-4 may be appropriate to the TFT array panel shown in FIGS. 36A-36D.

The slope members can be applicable to any type of LCDs such as twisted nematic (TN) type LCDs or in-plane switching (IPS) type LCDs.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display panel, comprising:
    a substrate;
    a field-generating electrode formed on a surface of the substrate; and
    a slope member formed on the field-generating electrode having a ridge and an inclined surface,
    wherein the inclined surface has a height gradually decreasing from the ridge to an edge of the slope member,
    wherein the inclined surface comprises a first inclination angle and a second inclination angel, the first inclination angle is in a range of 1-10 degrees and the second inclination angle is in a range of 1-5 degrees with respect to the surface of the substrate.

2. The liquid crystal display panel of claim 1, wherein the field generating electrode has a cutout.

3. The liquid crystal display panel of claim 2, wherein the ridge is disposed to correspond to the cutout.

4. The liquid crystal display panel of claim 2, wherein a boundary of the slope member is disposed to correspond to the cutout.

5. The liquid crystal display panel of claim 1, wherein the slope member comprises photosensitive organic insulator.

6. The liquid crystal display panel of claim 1, further comprising an alignment layer disposed on the slope member.

7. The liquid crystal display panel of claim 1, wherein the field-generating electrode is chamfered at its left corners and at least one of the plurality of planar boundaries of the slope member parallels the chamfered left edges of the field-generating electrode.

8. A liquid crystal display, comprising:
    a substrate;
    a first field-generating electrode having a first area formed on the substrate and having a first cutout;
    a second field-generating electrode disposed opposite the first field-generating electrode and having a second cutout;
    a liquid crystal layer disposed between the first field-generating electrode and the second field-generating electrode; and
    a plurality of slope members disposed on the first field generating electrode and each having a ridge and inclined surfaces that reduces a response time of the liquid crystal layer, the plurality of slope members occupying an area larger than half of the first area,
    wherein the inclined surfaces are flat and at least a portion of the inclined surfaces is disposed on and aligned with the first field-generating electrode,
    wherein the first cutout is disposed to correspond to the ridge and the second cutout is disposed to correspond to a boundary of the plurality of slope members.

9. The liquid crystal display of claim 8, wherein the slope members each have a gradually decreasing height.

10. The liquid crystal display of claim 8, wherein each of the slope members comprise an organic insulator having a dielectric constant equal to or smaller than the liquid crystal layer.

11. The liquid crystal display of claim 8, wherein the liquid crystal layer has negative anisotropy and subjected to a vertical alignment.

12. The liquid crystal display of claim 8, wherein each of the slope members have a thickness in a range of about 0.5-2.0 microns.

13. The liquid crystal display panel of claim 8, wherein the field-generating electrode is chamfered at its left corners and at least one of the plurality of planar boundaries of each of the slope members parallels the chamfered left edges of the field-generating electrode.

* * * * *